United States Patent
Huang

(10) Patent No.: US 9,411,824 B2
(45) Date of Patent: *Aug. 9, 2016

(54) METHOD AND APPARATUS FOR IMAGE RETRIEVAL

(71) Applicant: Lida Huang, Austin, TX (US)

(72) Inventor: Lida Huang, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/569,775

(22) Filed: Dec. 14, 2014

(65) Prior Publication Data

US 2015/0098659 A1    Apr. 9, 2015

Related U.S. Application Data

(63) Continuation-in-part of application No. 13/662,389, filed on Oct. 26, 2012, now Pat. No. 8,942,515.

(51) Int. Cl.
| | |
|---|---|
| *G06K 9/54* | (2006.01) |
| *G06K 9/60* | (2006.01) |
| *G06F 17/30* | (2006.01) |
| *G06K 9/46* | (2006.01) |
| *G06K 9/62* | (2006.01) |

(52) U.S. Cl.
CPC ........ *G06F 17/30247* (2013.01); *G06K 9/4671* (2013.01); *G06K 9/6211* (2013.01)

(58) Field of Classification Search
CPC .................................................. G06K 9/4671
USPC .................. 382/181, 190, 195, 199, 201, 305
See application file for complete search history.

(56) References Cited

U.S. PATENT DOCUMENTS 8,942,515 B1 * 1/2015 Huang ................. G06K 9/6211
                                                      382/190

* cited by examiner

*Primary Examiner* — John Strege
(74) *Attorney, Agent, or Firm* — Che-Yang Chen; Law Offices of Scott Warmuth

(57) ABSTRACT

An efficient image retrieval method utilizing topological order distance (TOD) algorithm is disclosed. In one aspect, an image recognition method may include steps of receiving one or more input images; extracting one or more key features on the input images; determining an origin and one or more feature points on the key features on the input images; establishing a topological relationship in each dimension between the feature points on the key features; and utilizing the topological relationship in each dimension between the feature points to identify the input images in an image database. Comparing with the conventional image retrieval techniques, the TOD algorithm is advantageous because it is more efficient, scale and rotation invariant, and tolerant to affine and perspective transformation.

5 Claims, 27 Drawing Sheets

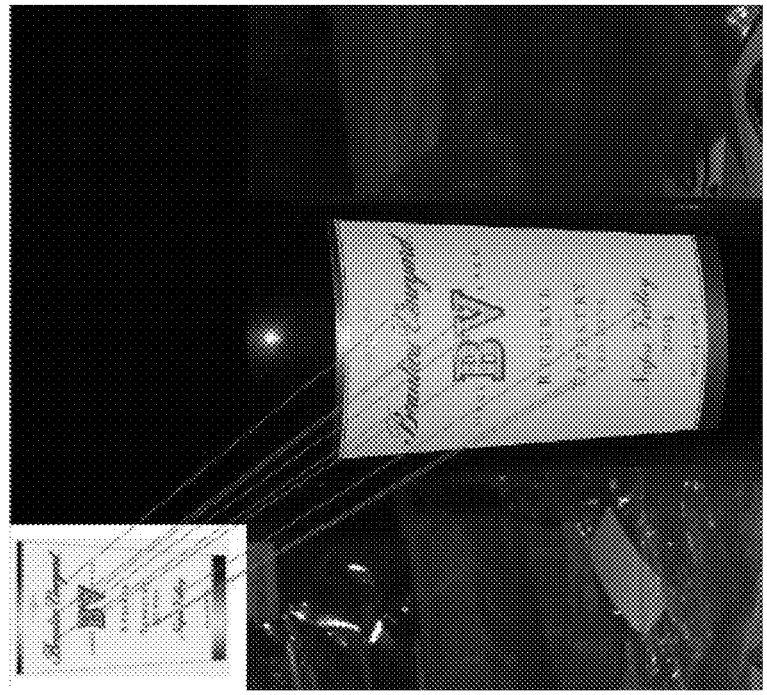
FIG. 1 (Prior Art)

METHOD AND APPARATUS FOR IMAGE RETRIEVAL

CROSS-REFERENCE TO RELATED APPLICATIONS

This application is a continuous-in-part (CIP) application of Ser. No. 13/662,389, filed on Oct. 26, 2012 now pending, which is incorporated herein by reference.

FIELD OF THE INVENTION

The present invention relates to a method and apparatus for image retrieval, and more particularly to an efficient method and apparatus to retrieve images from an image database to match an input image, regardless of the conditions of the input image.

BACKGROUND OF THE INVENTION

With remarkable advances of computer technologies and the increasing popularity of digital cameras and digital video cameras, it is common for an individual to possess a large database of digital images, and how to efficiently retrieve desired images from the image database becomes an increasingly important topic in computer vision.

Content-Based Image Retrieval (CBIR) addresses the matching and retrieval of images that share similar visual contents with a given image. The most common CBIR method for comparing two images in content-based image retrieval (typically an example image and an image from the database) is using an image distance measure. An image distance measure compares the similarity of two images in various dimensions such as color, texture, shape, and others. More advanced CBIR systems retrieve images by statistically attaching linguistic indexes and retrieving by index association or using learned mappings in feature space to group similar images. However, the CBIR system may have limitation when handling images with scale or rotation variations.

For any object in an image, interesting points on the object can be extracted to provide a "feature description" of the object, which can then be used to identify the object when attempting to locate the object in another image including many other objects. To perform reliable recognition, it is important that the extracted features are detectable even under changes in image scale, noise and illumination. Scale Invariant Feature Transforms (SIFT), developed by David Lowe in 1999, is an algorithm that is invariant to rotation, translation and scale variation between images. In other words, the key points extracted and described by SIFT were robustly invariant to common image transforms. However, there may be a significant amount of data generated by using the SIFT method and high computational cost to process these data may be involved.

SURF (Speeded Up Robust Feature), another algorithm similar to SIFT, was proposed by Herbert Bay et al. in 2006 to ensure high speed in three of the feature steps: detection, description and matching. Utilizing the Hessian matrix, SURF significantly increases the processing speed without sacrificing the quality of detection points. As shown in FIG. 1, SURF can complete the detection process of the wine tag in 78.2 ms, while SIFT is taking a longer time of 855.09 ms. More specifically, SURF algorithm may include a feature extraction process, and a so called "blob detection" technique is often used to extract key features. Blob detection refers to a feature finding method that detects points and/or regions in an image having different properties such as brightness, color, etc. compared with the environment, and the Hessian matrix is used to generate the blobs to locate key features. As can be seen in FIG. 2, a plurality of blobs are generated utilizing the Hessian matrix to identify key features in a sunflower field image (Herbert Bay, Andreas Ess, Tinne Tuytelaars, Luc Van Gool "SURF: Speeded Up Robust Features", Computer Vision and Image Understanding (CVIU), Vol. 110, No. 3, pp. 346-359, 2008, which is incorporated herein by reference). However, SURF still has its limitations especially when the resolution of the image is low.

In addition to SIFT and SURF that are commonly used in the computer vision community, a recognition scheme called "Scalable Recognition with a Vocabulary Tree" has been proposed recently. FIG. 3 illustrates an example for the vocabulary tree scheme, where a large number of elliptical regions 301 are extracted from the image and a descriptor vector is computed for each region (www.cs.ualberta.ca/~vis/vision06/slides/birs2006-nister-index.pdf, which is incorporated herein by reference). The vocabulary tree is then used to hierarchically quantize the descriptor vector into several quantization layers. For example, in the first quantization layer, the descriptor is assigned to the closest three closest green centers 302 to 304, and in the second quantization layer, it is assigned to the closest three blue descendants to the green centers 302 to 304. In the vocabulary tree, each node is associated with an inverted file with references to the images containing an instance of the node, and the images in the database are hierarchically scored using the inverted files at multiple levels of the vocabulary tree. However, the noise level is usually high in the vocabulary tree scheme and some quantization errors are embedded. Furthermore, the vocabulary tree scheme cannot efficiently capture local features of the image.

Therefore, there remains a need for a new and improved method and apparatus to efficiently retrieve images, especially when the quality of the image may be affected by scale, orientation, background clutter, lighting conditions, shape of the image, etc.

SUMMARY OF THE INVENTION

It is an object of the present invention to provide a method and apparatus to efficiently retrieve images, especially when the resolution of the image is low, the size of the image is tiny, or the shape of the image is irregular.

It is another object of the present invention to provide an efficient image retrieval method and apparatus that is rotation invariant, scale invariant, and tolerant to affine and perspective transformation.

It is a further object of the present invention to provide an efficient image retrieval method and apparatus that not only compares features between images, but also focuses on a topological relationship in each dimension between the features.

It is still a further object of the present invention to use the topological relationship between the key features to generate a topological order distance (TOD) to further identify and recognize input images in an image database.

It is still a further object of the present invention to incorporate the TOD algorithm into the applications of spatial navigation and electronic design automation (EDA).

According to one aspect of the present invention, an image recognition method may include steps of receiving one or more input images; extracting one or more key features on the input images; determining an origin and one or more feature points on the key features on the input images; establishing a topological relationship in each dimension between the feature points on the key features; and utilizing the topological relationship in each dimension between the feature points to identify the input images in an image database.

In one embodiment, the step of extracting one or more key features on the input images may include a step of generating a plurality of blobs to identify key features on the input images. In another embodiment, the step of extracting one or more key features on the input images may include the edge detection technique, especially when the key features of the image have discontinuities in depth and orientation, or the brightness of key features changes sharply. In a further embodiment, the step may include the feature extraction technique of corner detection. In still a further embodiment, the step may include the technique of descriptor-detector local feature extractions.

In still a further embodiment, the step of determining an origin and one or more feature points on the key features on the input images may include steps of selecting an origin on the input images; converting an initial coordinate system into a predetermined coordinate system; and selecting one or more feature points representing some key features near the origin. In a further embodiment, the predetermined coordinate system is a polar coordinate system.

In an exemplary embodiment, the step of establishing a topological relationship in each dimension between the feature points on the key features may include steps of calculating and sorting the distances between each feature points and the origin to produce one or more sequences according to the dimension of the image. In a two-dimensional image, the step of establishing a topological relationship in each dimension between the feature points on the key features may include steps of calculating and sorting the distances between each feature points and the origin to produce a magnitude sequence; and calculating and sorting the angles between each feature points and the origin to produce an angle sequence.

In still an exemplary embodiment, the step of utilizing the topological relationship in each dimension between the feature points to identify the input image in an image database may include steps of building a predetermined data structure in the image database; providing the key features from the input image; retrieving the key features (from the input image) in the predetermined data structure within a given range; comparing the sequence(s) between the input images and possible matching images in the image database to generate one or more TOD scores; and calculating and sorting the TOD scores to retrieve matching images in the image database. In a two-dimensional image, the step of utilizing the topological relationship between the feature points to identify the input image in an image database includes steps of building a predetermined data structure in the image database; providing the key features from the input image; retrieving the key features (from the input image) in the predetermined data structure within a given range; comparing the magnitude sequences and angle sequences between the input images and possible matching images in the image database to generate an M-TOD score and an A-TOD score; and calculating and sorting the M-TOD and A-TOD scores to retrieve matching images in the image database.

In another aspect of the present invention, a system for image retrieval may include an initial image receiver; a key feature extracting unit including a feature point generator; an image database and an image processor executing instructions to perform the steps of establishing a topological relationship in each dimension between the feature points on the key features and utilizing the topological relationship in each dimension between the feature points to identify the input image in the image database. The image retrieval system may also include a memory device and a user interface, which may be operatively communicated with the image processor to perform image recognition and retrieval.

In one embodiment, the feature point generator is configured to select an origin among the key features, and the origin is better surrounded by the key features that would better represent the given image. Also, the feature generator is configured to convert an initial coordinate system into a predetermined coordinate system and select one or more feature points representing the key features near the origin. In an alternative embodiment, the predetermined coordinate system is a polar coordinate system.

In an exemplary embodiment for a two-dimensional image, the image processor may include a magnitude sequence generator and an angle sequence generator. The magnitude sequence generator is configured to measure the distances between each feature points and the origin; compare such information; and produce a magnitude sequence, while the angle sequence generator is configured to measure the angles between each feature points and the origin; compare such information; and produce an angle sequence.

In still an exemplary embodiment for a two-dimensional image, the image processor also includes an image retrieving unit and an M-TOD/A-TOD processor. The image retrieving unit is configured to efficiently retrieve images that may match the input image from the image database, wherein the image retrieving unit may build a predetermined data structure (e.g. k-d tree) to divide the images in the image database into a plurality of sub-groups. Provided with the information of key features of the input image, the image retrieving unit is configured to retrieve possible matching images from the image database according to the k-d tree structure, and the magnitude sequence generator and angle sequence generator would perform identical magnitude/angle sequence generating process to the possible matching images extracted from the image database. The M-TOD/A-TOD processor is adapted to compare the magnitude/angle sequence between the input image and the possible matching images, calculate scores based on the comparison of the magnitude/angle sequence therebewteen, and determine the matching images in the image database. The matching images can be outputted through the user interface.

Comparing with the conventional image retrieval techniques such as SIFT, SURF, vocabulary tree, etc., the TOD algorithm is advantageous because it is more efficient, scale and rotation invariant, and tolerant to affine and perspective transformation.

BRIEF DESCRIPTION OF THE DRAWINGS

FIG. 1 illustrates a comparison between two conventional image retrieval techniques.

FIG. 6b shows the possible matching images extracted from the image database.

FIG. 7b shows the possible matching images extracted from the image database.

FIG. 8b shows the possible matching images extracted from the image database.

FIG. 9b shows the possible matching images extracted from the image database.

FIG. 10b shows the possible matching images extracted from the image database.

FIG. 11b shows the possible matching images extracted from the image database.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As previously discussed, feature detection and image matching become an increasingly important topic in the area of computer vision. However, due to appearance variabilities caused by non-rigidity, background clutter, differences in viewpoint, orientation, scale or lighting conditions, it is difficult and challenging to efficiently retrieve images from an image database. Current image retrieving/matching algorithms (such as CBIR, SIFT, SURF, vocabulary tree, etc.) may perform acceptably well in presence of some of the image conditions stated above, but in general, none of the algorithms have truly accomplished total invariance to those conditions. Therefore, there remains a need for a new and improved method and apparatus to overcome the image conditions described above and efficiently retrieve desired image(s).

Figure 4:
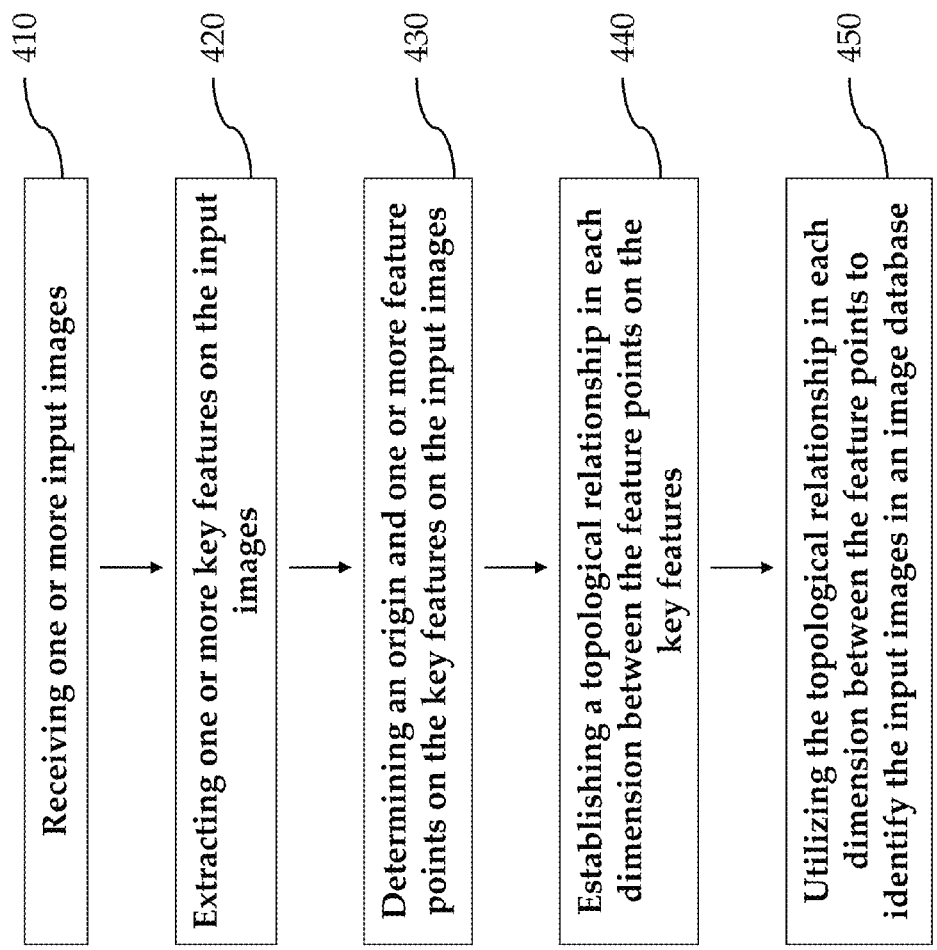
FIG. 4 illustrates a method for efficient image retrieval in the present invention.

In one aspect shown in FIG. 4, an image recognition method may include steps of receiving one or more input images 410; extracting one or more key features on the input images 420; determining an origin and one or more feature points on the key features on the input images 430; establishing a topological relationship in each dimension between the feature points on the key features 440; and utilizing the topological relationship in each dimension between the feature points to identify the input images in an image database 450.

Figure 2:
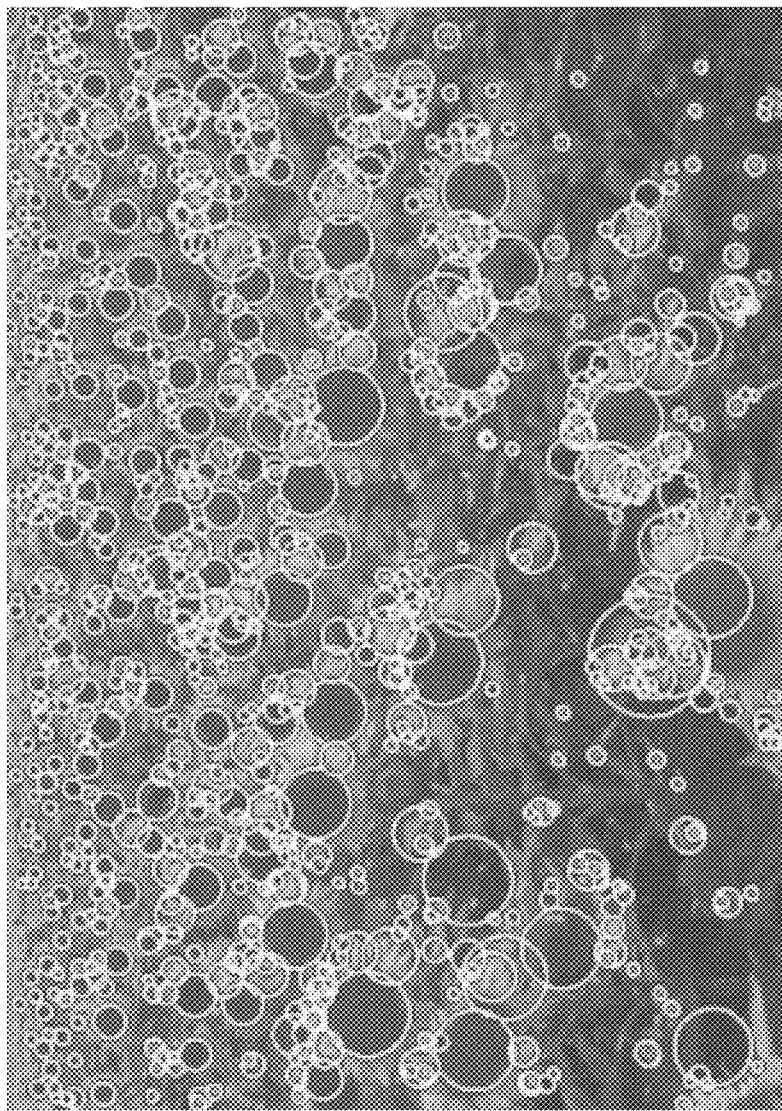
FIG. 2 illustrates a plurality of blob detectors generated by the Hessian matrix to identify key features in a sunflower field image.
Figure 3:
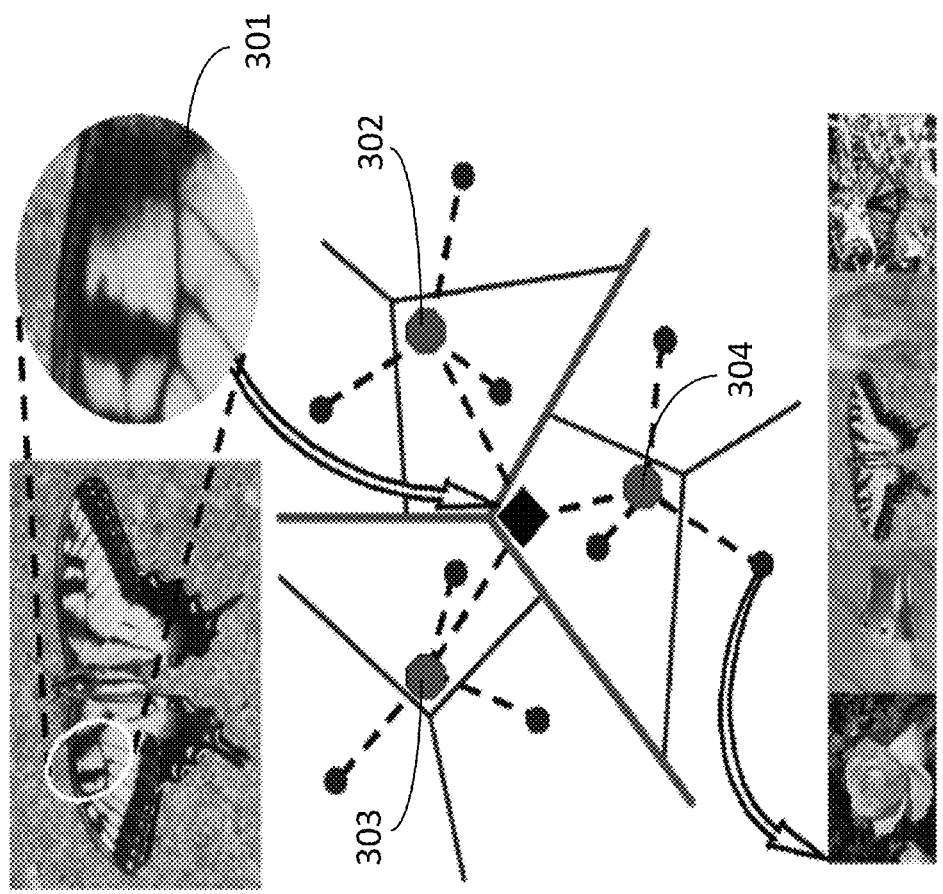
FIG. 3 illustrates an example for the vocabulary tree scheme, where a large number of elliptical regions are extracted from the image and a descriptor vector is computed for each region.

As described above, key feature extraction techniques are often employed in the area of image processing and several algorithms to extract key features have been developed according to the characteristics of the image. In one embodiment, the step of extracting one or more key features on the input images 420 may include a steps of generating a plurality of blobs to identify key features, wherein blob detection refers to the detection of points and/or regions in an image having different properties such as brightness, color, etc. compared with the environment, as shown in FIG. 2. In another embodiment, the step of extracting one or more key features on the input images 420 may include the edge detection technique, especially when the key features of the image have discontinuities in depth and orientation, or the brightness of key features changes sharply. In a further embodiment, the step 420 may include the feature extraction technique of corner detection. In still a further embodiment, the step 420 may include the feature extraction technique of descriptor-detector local feature extractions.

Figure 4A:
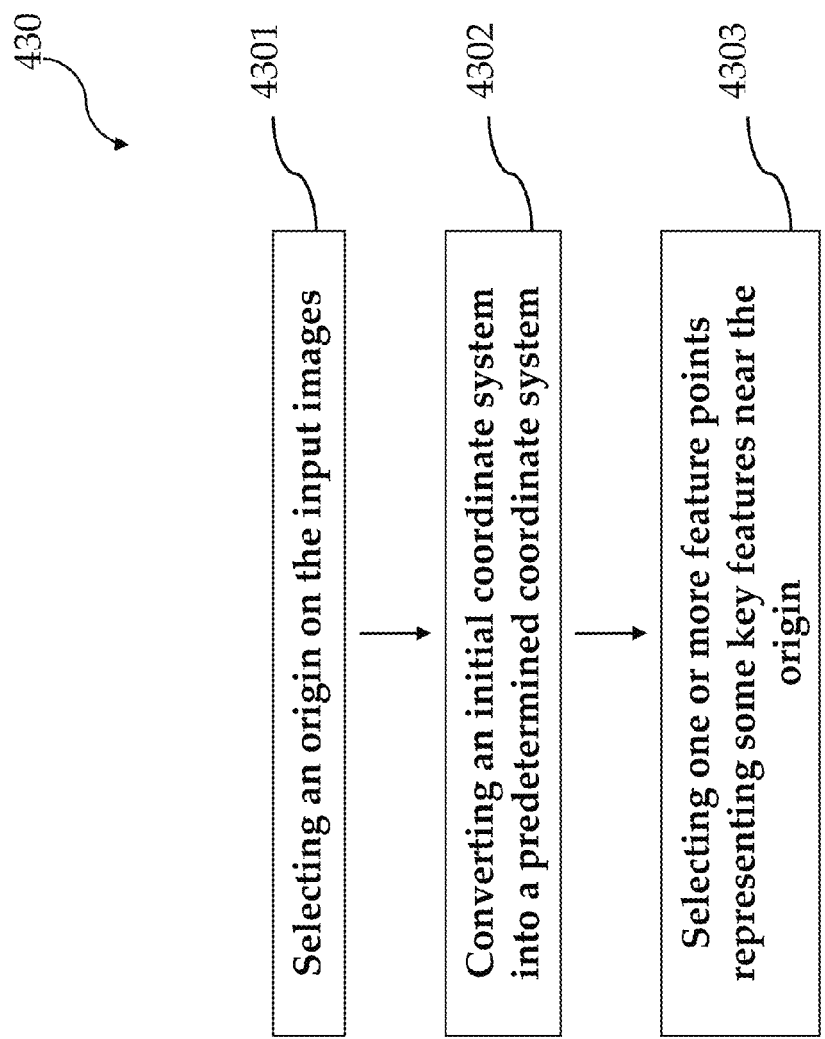
FIG. 4a depicts further steps to determine an origin and one or more feature points on the key features on the input image.
Figure 4B:
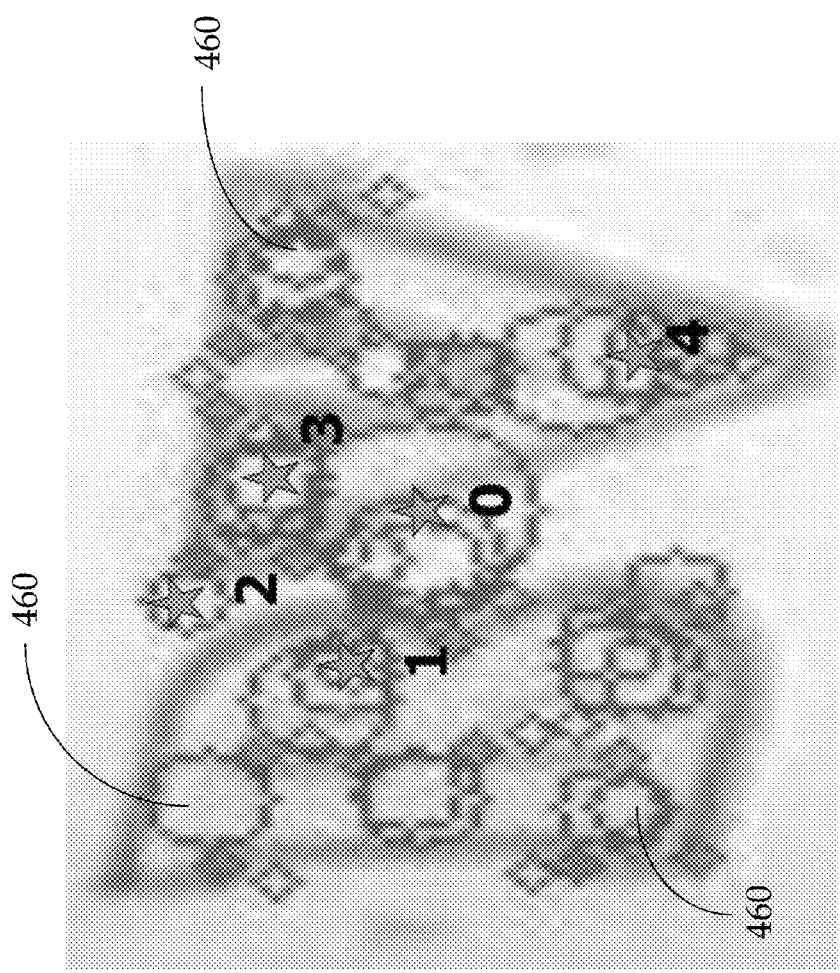
FIG. 4b shows an example of extracting key features and determining feature points on the key features on the input image.

In still a further embodiment illustrated in FIG. 4a, the step of determining an origin and one or more feature points on the key features on the input images 430 may include steps of selecting an origin on the input images 4301; converting an initial coordinate system into a predetermined coordinate system 4302; and selecting one or more feature points representing some key features near the origin 4303. In an exemplary embodiment, the predetermined coordinate system is a polar coordinate system. For example, an image of a BV wine tag is shown in FIG. 4b, where a plurality of blobs 460 are generated to identify key features on the BV wine tag, and a feature point 1 (located at the upper right hand side of the letter "B"), feature point 2 (located at the upper left corner of the letter "V"), feature point 3 (located the upper left corner slightly right of the feature point 2), and feature point 4 (located at lower portion of the letter "V") are selected around the origin "0." In one embodiment, the blobs may be generated by the Hessian matrix as stated above.

Conventional image retrieval algorithms or techniques focus more on comparing and matching the key features of the images, which is disadvantageous especially when the input image is too small, the resolution of the input image is too low, or the input image is not planar. Also, conventional algorithms may need more time to compare and match key features of the images. While focusing on the key features of the images, conventional techniques seem to overlook the importance of the relative locations of the key features. In the present invention, a topological relationship between the feature points is established to more efficiently retrieve images comparing with conventional image retrieval algorithms. Referring again to FIG. 4b for an example, in a polar coordinate system, the distances between each feature points (1, 2, 3, 4) and the origin (0) can be sorted to produce a "Magnitude Sequence," while the angles between each feature points (1, 2, 3, 4) and the origin (0) can also be sorted to produce a "Angle Sequence." As a result, the magnitude sequence of the four feature points is (1, 3, 2, 4), while the angle sequence of the four feature points is (3, 4, 1, 2), as illustrated in FIG. 4b. In other embodiments, the topological relationship can be extended to multiple dimensions, and a sequence such as the magnitude or angle sequence may have to be generated to establish the topological relationship in every dimension.

Figure 4C:
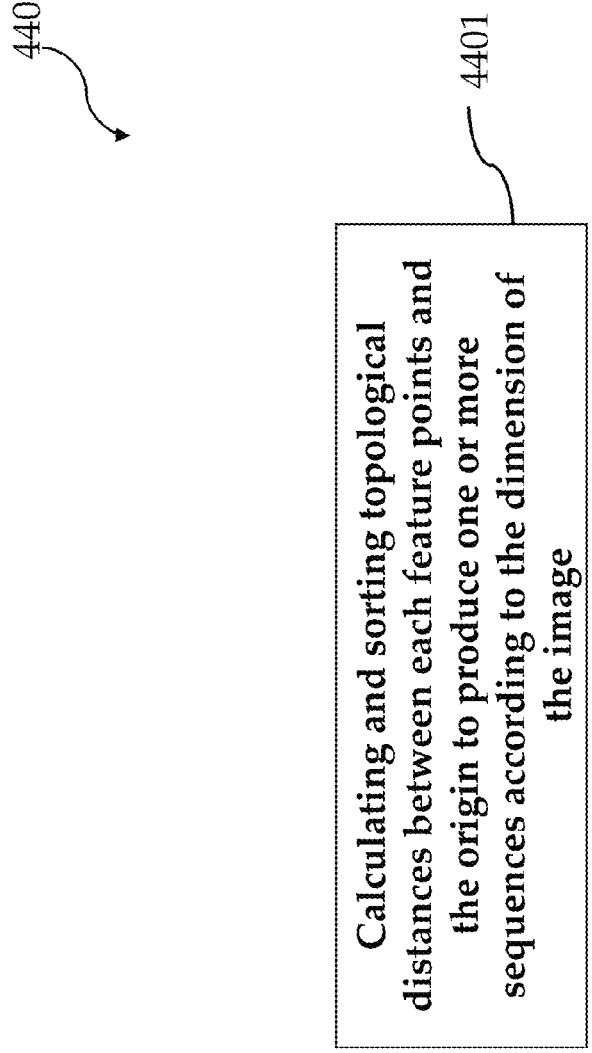
FIG. 4c depicts further steps to establish a topological relationship between the feature points on the key features.

Referring to FIG. 4c, the step of establishing a topological relationship in each dimension between the feature points on the key features 440 may include a step of steps calculating and sorting the distances between each feature points and the origin to produce one or more sequences according to the dimension of the image 4401. In a two-dimensional image, the step of establishing a topological relationship between the feature points on the key features calculating and sorting the distances between each feature points and the origin to produce a magnitude sequence; and calculating and sorting the angles between each feature points and the origin to produce an angle sequence.

Furthermore, a topological order distance (TOD) is introduced and is defined as a "longest common subsequence (LCS) between the given image and a potential matching image in the database. In a two-dimensional image, there are two TODs: Angle TOD (A-TOD) and Magnitude TOD (M-TOD), corresponding to the "Angle Sequence" and "Magnitude Sequence" discussed above, wherein the Angle TOD represents the agreement on relative order of the angle sequence between the given image and potential matching image, while the Magnitude TOD represents the agreement on relative order of the magnitude sequence therebetween. Assuming the origin is at the same position in the input image and a first potential matching image, and each image has five feature points. For example, if the angle sequence of the input image is (1, 3, 4, 2, 5) and the angle sequence of the first potential matching image is (1, 3, 4, 5, 2), the longest common sequences between these two images are three, namely (1, 3, 4). On the other hand, if the angle sequence of a second potential matching image is (1, 3, 2, 5, 4), the longest common sequences between the input image and the second potential matching image are two, namely (1, 3), and the score of the second potential matching image would be lower than the first potential matching image in terms of A-TOD. Similar comparison can be conducted in the magnitude sequence between the images in terms of M-TOD, and a combined score can be generated to determine which images are the closest to the input image. It is noted that the number of TOD is determined according to the dimension of the image.

Figure 4D:
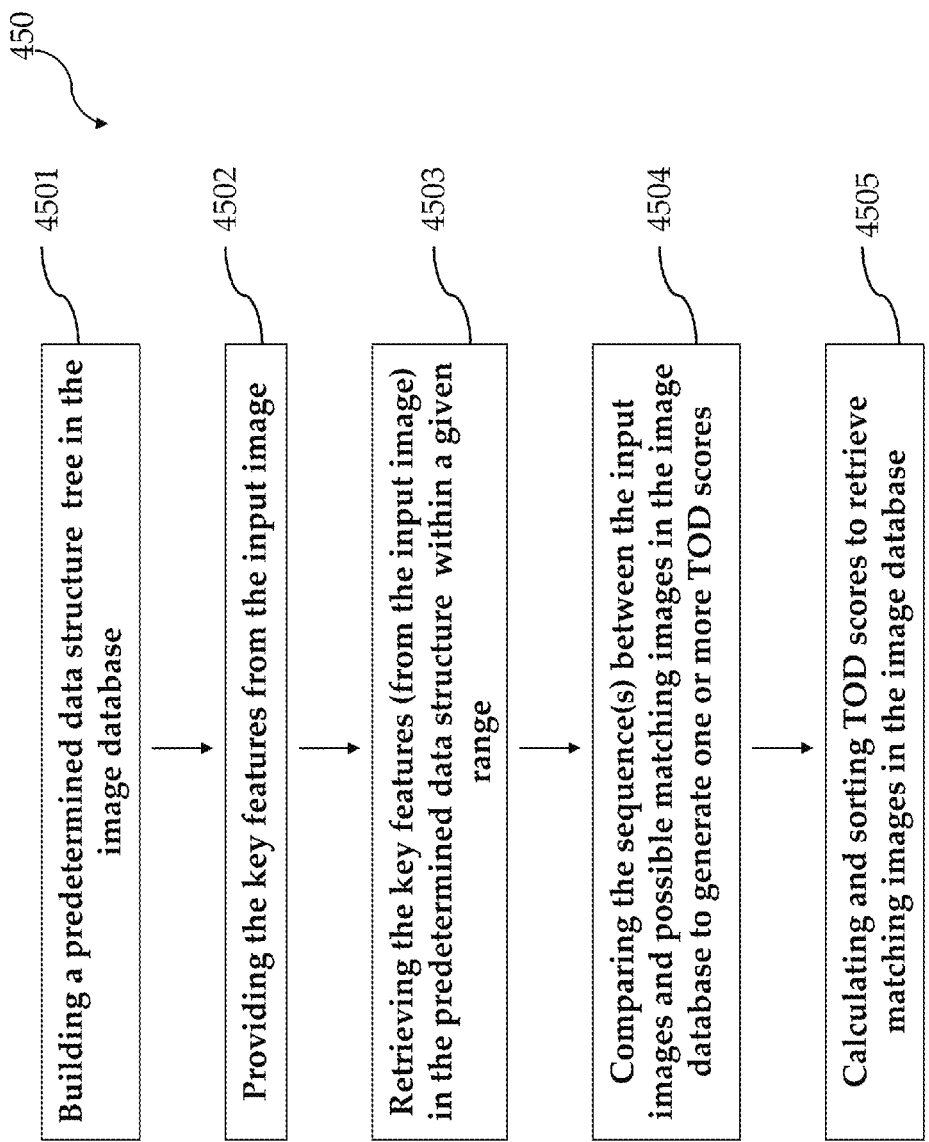
FIG. 4d illustrates further steps to utilize the topological relationship between the feature points to identify the input image in an image database.

In still an exemplary embodiment shown in FIG. 4d, the step of utilizing the topological relationship in each dimension between the feature points to identify the input image in an image database 450 may include steps of building a predetermined data structure in the image database 4501; providing the key features from the input image 4502; retrieving the key features (from the input image) in the predetermined data structure within a given range 4503; comparing the sequence(s) between the input images and possible matching images in the image database to generate one or more TOD scores 4504; and calculating and sorting the TOD scores to retrieve matching images in the image database 4505. In one embodiment, the predetermined data structure can be a k-dimensional tree ("k-d tree"), which is a space-partitioning data structure for organizing points in a k-dimensional space. Namely, the k-d tree is used to hierarchically decompose spaces into a plurality of cells such that it is fast to access any input object by position in each cell.

Figure 4E:
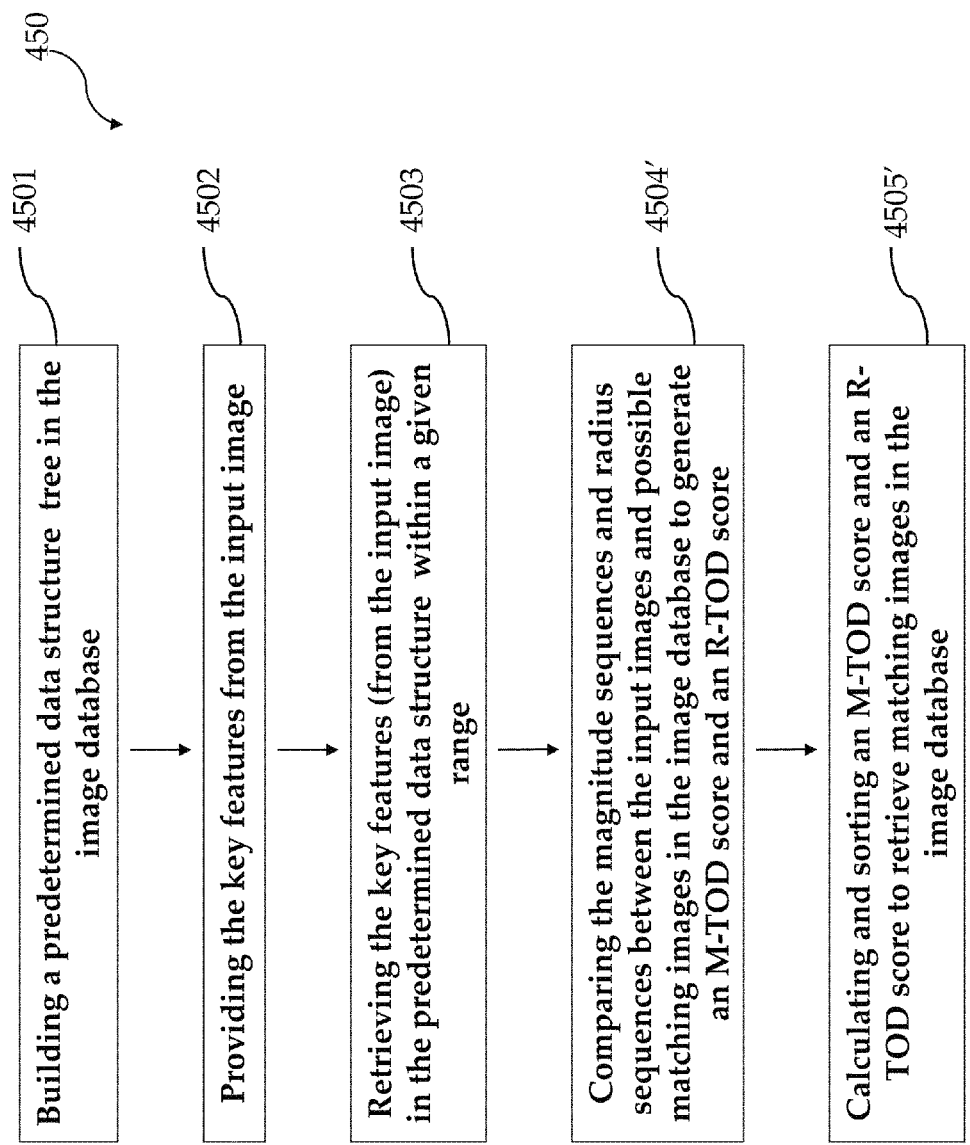
FIG. 4e illustrates further steps to utilize the topological relationship in a two-dimensional image between the feature points to identify the input image in an image database.

In a two-dimensional image, the steps 4504 and 4505 may become comparing the magnitude sequences and angle sequences between the input images and possible matching images in the image database to generate an M-TOD score and an A-TOD score 4504'; and calculating and sorting an M-TOD score and an A-TOD score to retrieve matching images in the image database 4505', as shown in FIG. 4e.

Figure 5:
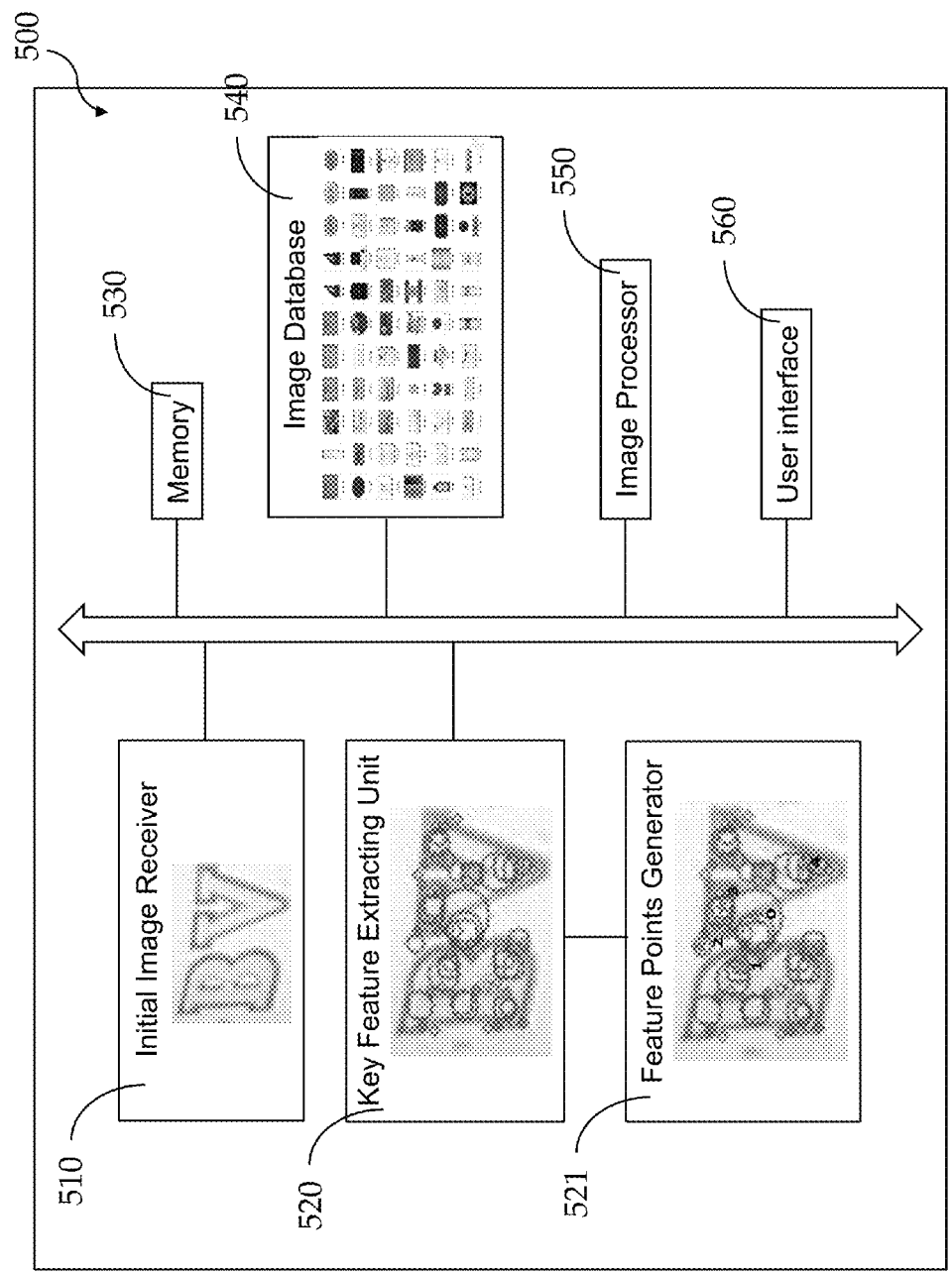
FIG. 5 depicts another aspect of the present invention, illustrating an efficient image retrieval system using TOD algorithm.

In another aspect of the present invention, a system 500 for image retrieval may include an initial image receiver 510; a key feature extracting unit 520; an image database 540 and an image processor 550 executing instructions to perform steps of establishing a topological relationship in each dimension between the feature points on the key features, and utilizing the topological relationship in each dimension between the feature points to identify the input image in the image database. The image retrieval system 500 may also include a memory device 530 and a user interface 560, which may be operatively communicate with the image processor 550 to perform image recognition and retrieval. The result of the image retrieval can be outputted through the user interface 560. In one embodiment, the key feature extracting unit 520 may include a feature point generator 521, as illustrated in FIG. 5.

In one embodiment, the key feature extracting unit 520 may be configured to extract key features by generating a plurality of blobs, especially when certain points and/or regions in an image having different properties such as brightness, color, etc. compared with the environment. In another embodiment, the key feature extracting unit 520 may be configured to conduct edge detection to extract key features, especially when the key features of the image have discontinuities in depth and orientation, or the brightness of key features changes sharply. In a further embodiment, the key feature extracting unit 520 is configured to conduct corner detection to extract key features. In still a further embodiment, the key feature extracting unit 520 is configured to conduct descriptor-detector local feature extractions.

As discussed above, the present invention not only focuses on the key features of the given image, but also the relative locations thereof. After the key features are extracted, the feature point generator 521 is configured to select an origin among the key features, and the origin is better surrounded by the key features that would better represent the given image. Also, the feature point generator 521 is configured to convert an initial coordinate system into a predetermined coordinate system (e.g. a polar coordinate system), and select one or more feature points representing the key features near the origin, as shown in FIG. 4b.

Figure 5A:
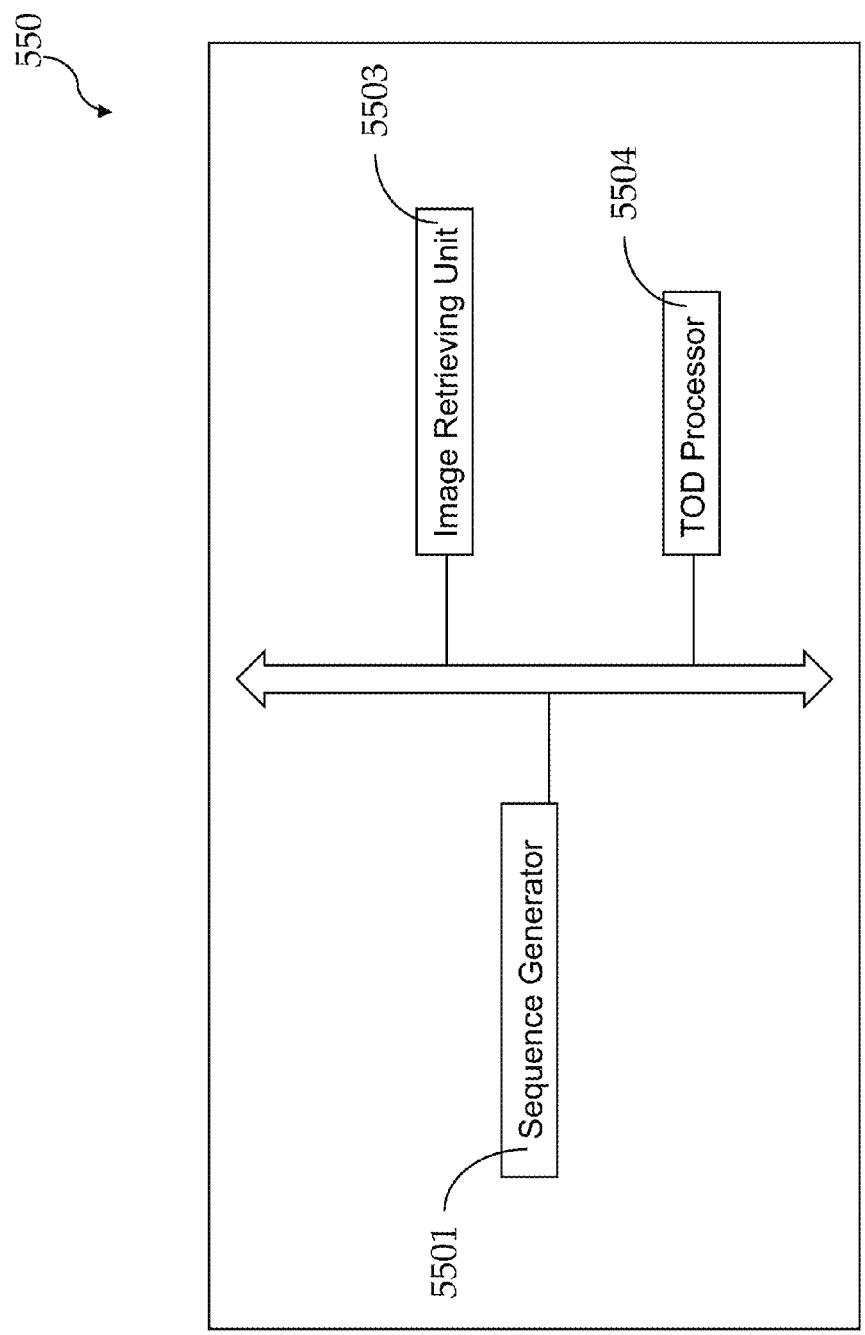
FIG. 5a illustrates one exemplary embodiment in the present invention shown in FIG. 5.
Figure 5B:
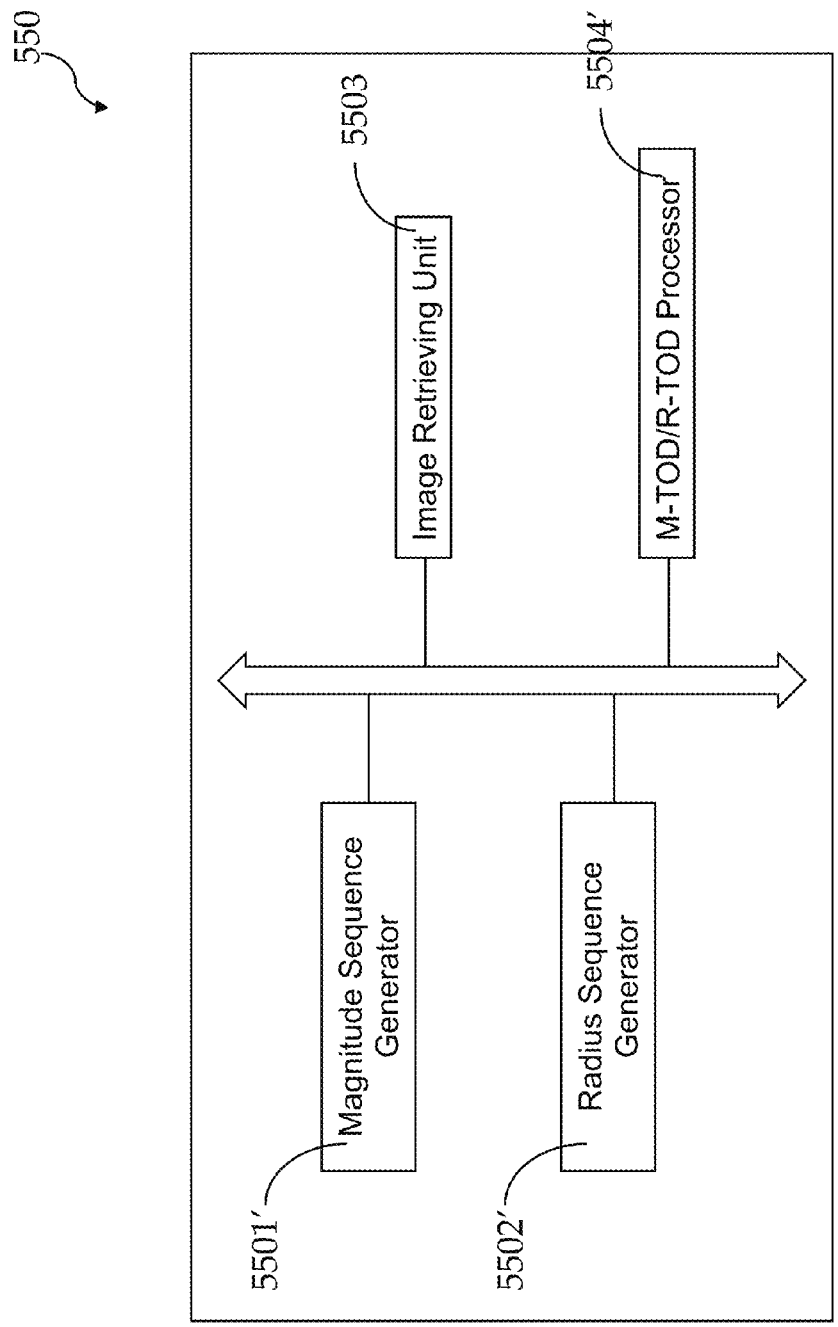
FIG. 5b illustrates one exemplary embodiment of FIG. 5a to handle two-dimensional images in the present invention.

In an exemplary embodiment illustrated in FIG. 5a, the image processor 550 may include a sequence generator 5501, an image retrieving unit 5503 and a TOD processor 5504. It is noted that the sequence generator 5501 is configured to configured to measure topological distances (e.g. length, angle, radius, etc.) between each feature points and the origin, and configured to produce a sequence based on the topological distances therebetween, as well as the TOD processor 5504, which is configured to generate one or more TOD scores according to the number of sequences. In a two-dimensional image, the sequence generator 5501 may include a magnitude sequence generator 5501' and an angle sequence generator 5502', an image retrieving unit 5503 and an M-TOD/A-TOD processor 5504', as shown in FIG. 5b. Referring to FIG. 4b again, the magnitude sequence generator 5501' is configured to measure the distances between each feature points (1, 2, 3, 4) and the origin (0); compare such information; and produce a magnitude sequence, while the angle sequence generator 5502' is configured to measure the angles between each feature points (1, 2, 3, 4) and the origin (0); compare such information; and produce an angle sequence. As a result, the magnitude sequence of the four feature points is (1, 3, 2, 4), while the angle sequence of the four feature points is (3, 4, 1, 2), as illustrated in FIG. 4b. It is noted that the magnitude sequence and angle sequence can be considered a "signature" of the image, which can be used as an identifier to compare with other images.

The image retrieving unit 5503 is configured to efficiently retrieve images that may match the input image from the image database 540, wherein the image retrieving unit 5503 may build a data structure (e.g. k-d tree) to divide the images in the image database 540 into a plurality of sub-groups. Provided with the information of key features of the input image, the image retrieving unit 5503 is configured to retrieve possible matching images from the image database 540 according to the key features of the input image; and the magnitude sequence generator 5501' and angle sequence generator 5502' would perform identical magnitude/angle sequence generating process to the possible matching images extracted from the image database 540.

As illustrated above, the topological order distance (TOD) is defined as a "longest common subsequence (LCS) between the given image and a potential matching image in the database, and there are two TODs in a two-dimensional image: Angle TOD (A-TOD) and Magnitude TOD (M-TOD), corresponding to the "Angle Sequence" and "Magnitude Sequence," wherein the A-TOD represents the agreement on relative order of the angle sequence between the given image and possible matching images, while the M-TOD represents the agreement on relative order of the magnitude sequence therebetween, and the longer the common subsequence between the input image and the potential matching image, the higher the score of the possible matching image, namely the possible matching image more similar to the input image. In the image processor 550, the M-TOD/A-TOD processor 5504' is adapted to compare the magnitude/angle sequence between the input image and the possible matching images, calculate scores based on the comparison of the magnitude/angle sequence therebewteen, and determine the matching images in the image database. The matching images can be outputted through the user interface 560.

Experiment I

Wine Tag Image Recognition

Figures 6A, 6B:
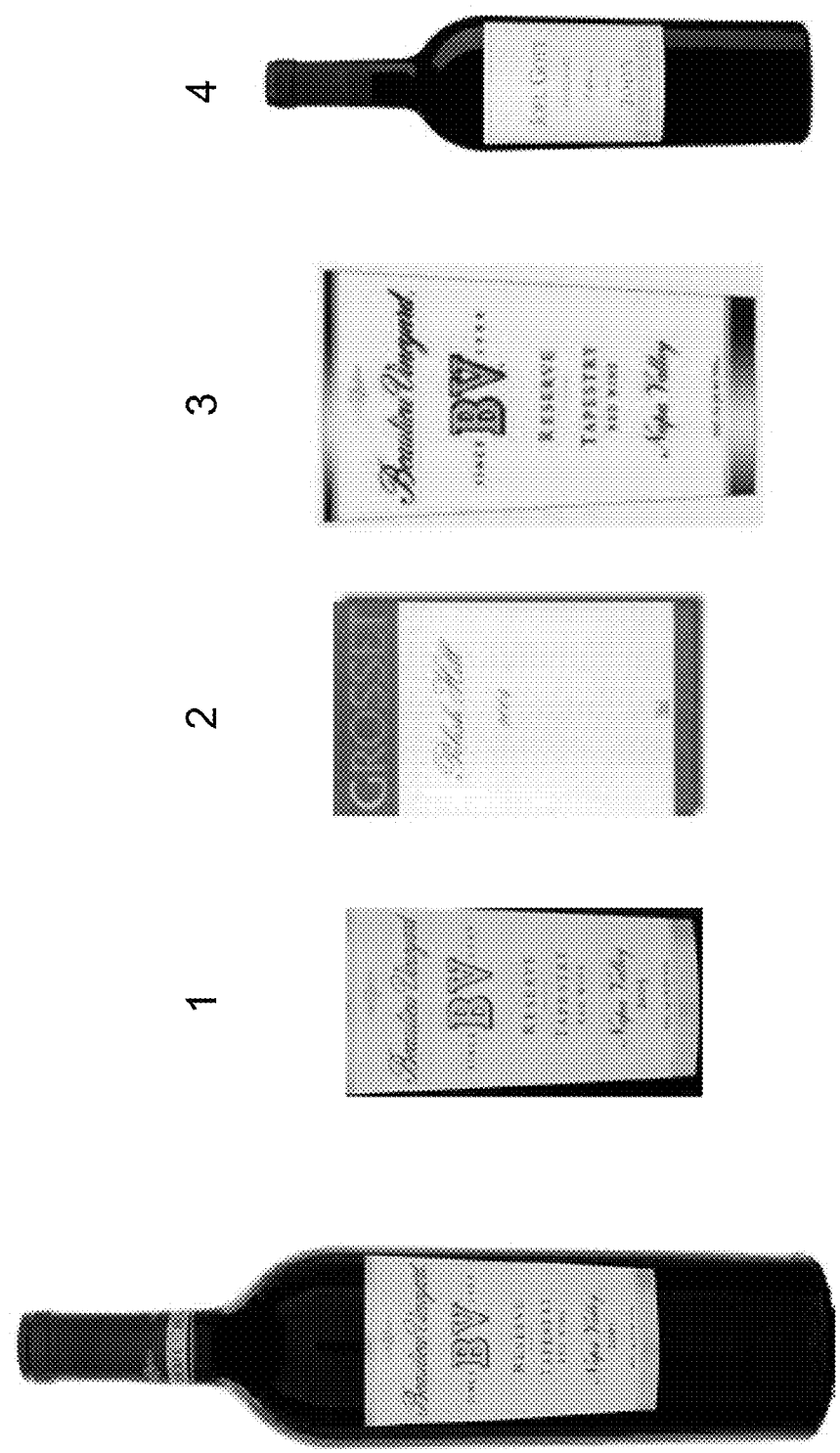
FIGS. 6a and 6b illustrate an experiment testing the TOD algorithm in the present invention, wherein FIG. 6a an input image.
Figures 7A, 7B:
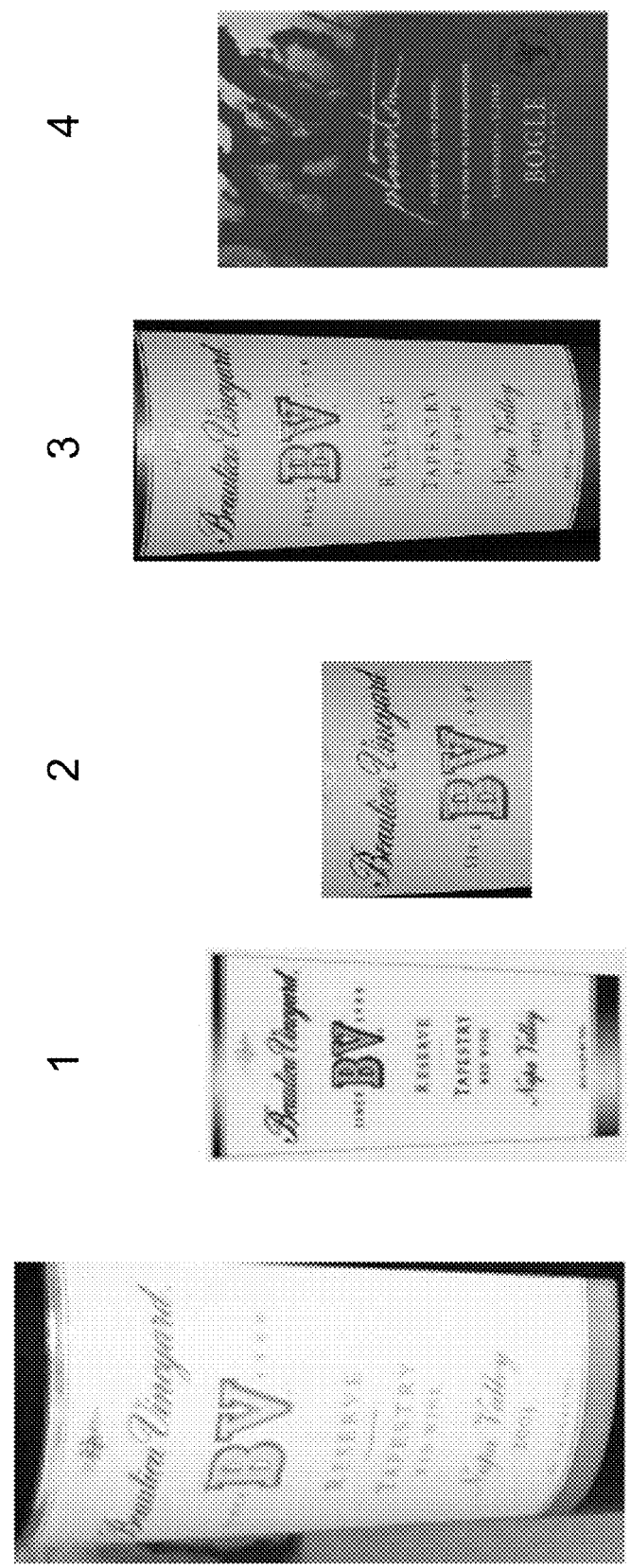
FIGS. 7a and 7b illustrate an experiment testing the TOD algorithm in the present invention, wherein FIG. 7a an input image.

The TOD algorithm illustrated above is tested to retrieve a "BV" red wine tag in an image database including images of 9352 wine tags, where the wine tag images are either tiny or with low resolution. FIG. 6a shows an input image extracted from the web, and FIG. 6b shows the results (top four highest scores from left to right) of using the TOD algorithm to retrieve possible matching images from the image database. According to the results in FIG. 6b, two of the top four ranking images match the input image. Similar experiment is conducted and shown in FIGS. 7a and 7b, where the results show that the first three of the top four ranking images match the input image. It is noted that the input image in FIG. 7a is somewhat blurry and not planar, however, the TOD algorithm is demonstrated to be efficient and scale/rotation invariant to successfully retrieve matching images from the image database.

Figures 8A, 8B:
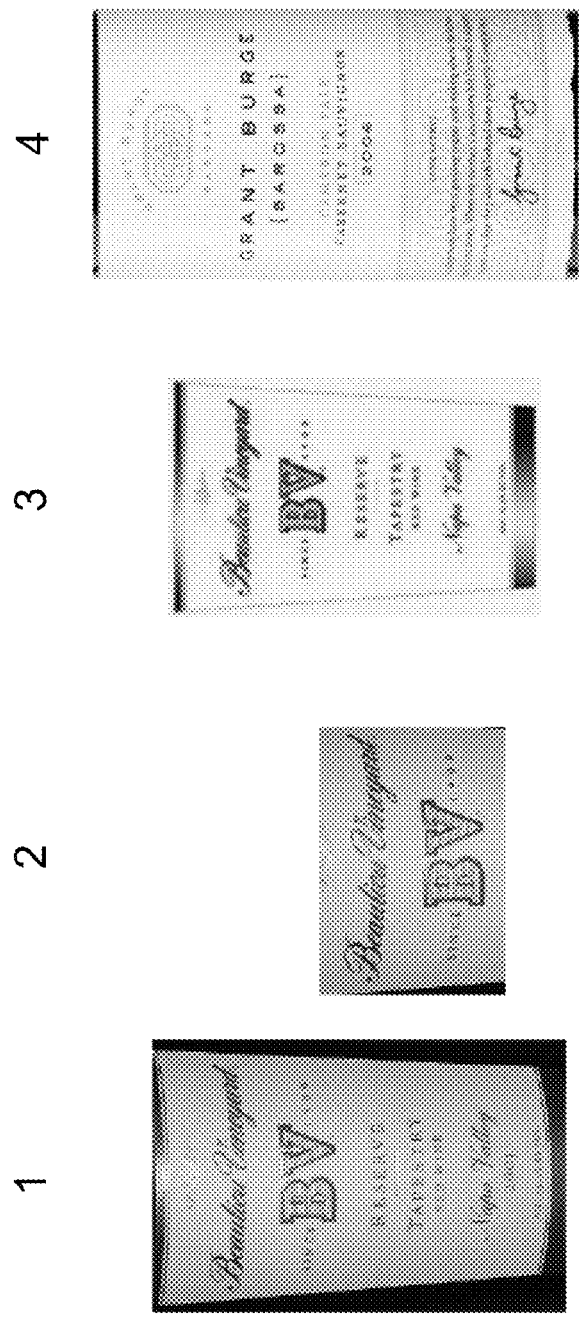
FIGS. 8a and 8b illustrate an experiment testing the TOD algorithm in the present invention, wherein FIG. 8a an input image.
Figures 9A, 9B:
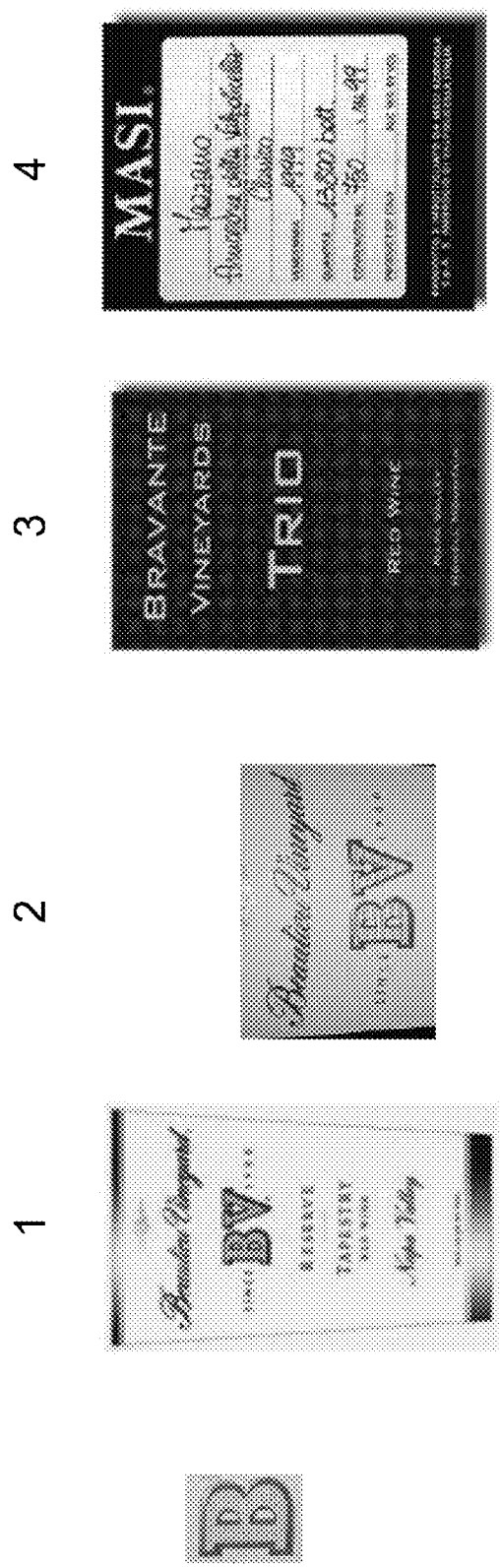
FIGS. 9a and 9b illustrate an experiment testing the TOD algorithm in the present invention, wherein FIG. 9a an input image.

FIGS. 8a and 8b illustrate another good results using the TOD algorithm. The results from this group is more interesting because the input image of FIG. 8a has low resolution with merely 102×74 pixels, however, the results demonstrate that the TOD algorithm is robust regardless of the resolution of the images. More importantly, the process time is only 1.4 ms which is far much faster than either SIFT (855.09 ms) and SURF (78.2 ms) illustrated in FIG. 1. Another experiment using an image with less information (only letter "B") and even lower resolution (44×58 pixels) is shown in FIGS. 9a and 9b. The results confirm that the TOD algorithm is robust regardless of the size and conditions of the images.

Figures 10A, 10B:
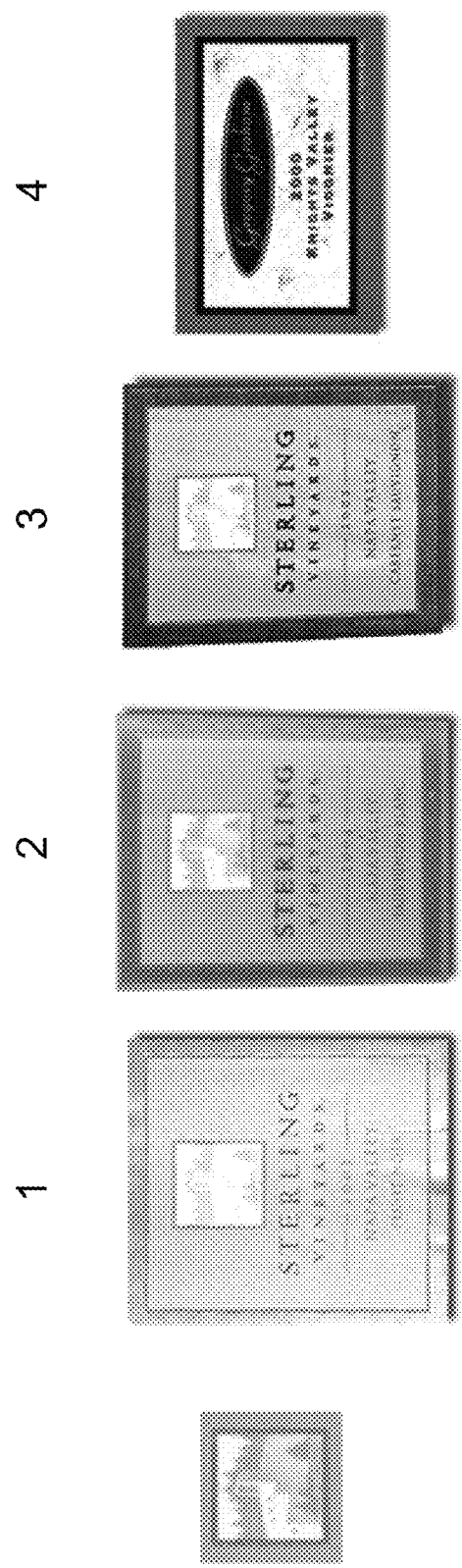
FIGS. 10a and 10b illustrate an experiment testing the TOD algorithm in the present invention, wherein FIG. 10a an input image.
Figure 11B:
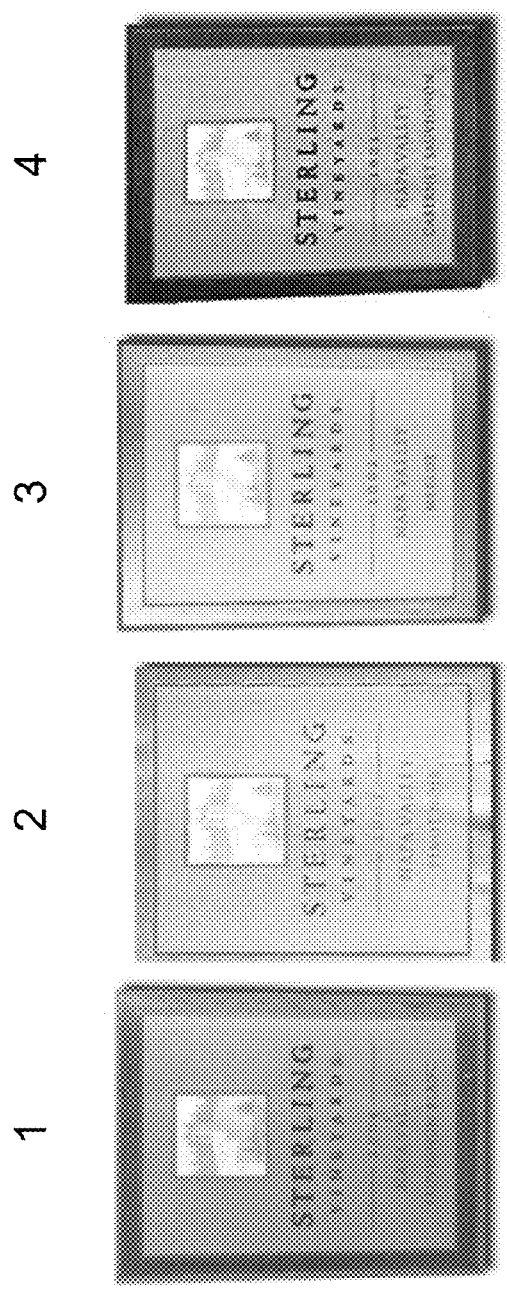
FIGS. 11a and 11b illustrate an experiment testing the TOD algorithm in the present invention, wherein FIG. 11a an input image.
Figure 11A:
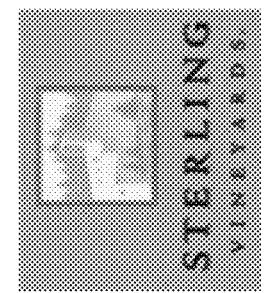

In addition to BV red wine tags, FIGS. 10a and 10b show another experiment to retrieve a wine tag (or wine tags) in the image database with a wine tag logo shown in FIG. 10a. Even though the input image in FIG. 10a is with even lower resolution (78×74 pixels), the TOD algorithm can still successfully retrieve matching images from the image database: three of the top four ranking retrieved images match the input image. More encouraging results show in FIGS. 11a and 11b, where all four top ranking images match an input image (140×120 pixels) shown in FIG. 11a.

In another aspect, the image recognition method in the present invention can be used in spatial navigation. Spatial navigation is one of the main tasks for humans to survive. Finding the way home, tracing the prey, and avoiding the predators all depend on an accurate spatial navigation capability. In addition to the success of the spatial navigation performed by an individual, a group of individuals collaborate on spatial navigation through information sharing is the key to compete with the fierce environment. The communications usually are succinct, roughly described, and come with a many noises that result into errors. These errors are caused of various perceptions among the peers and different descriptions when relaying the information. In more formal terms, the signal-to-noise ratio (SNR) is low, and the priori probability (i.e., precondition, knowledge possessed by the individual) plays an important role as a bias when interpreting the received spatial information from peers.

Experiment II

Collaboration Method for Spatial Navigation

In an unknown space, the first challenge of a navigation task is to construct the cognitive map. A collaboration method for spatial navigation is provided incorporating the image recognition method in the present invention to construct the cognitive map. In one embodiment, a plurality of entities are provided, and each entity communicates with the other entities and shares spatial navigation information with the other entities. The moving entity with information collection capability embedded with a given navigation task would explore this environment and gradually builds up a self-map.

In this embodiment, there are assumptions on the collaboration method of the invention used in each entity. The collaboration method is designed to provide the best performance with minimum uncertainties in the described collaboration cognitive problem. Each entity behaves based on the same model. This model assumes: (1) Perfect memory: all the cognitive maps received are reserved perfectly within each entity; and (2) Perfect match on its own cognitive map: Each entity maintains a self-cognitive map, Self-Map denoted as G_s, which represents all the paths and locations visited by this entity itself. Once the Self-Map is built, this entity knows where exactly its location at this G_s, what it expects to see after any sequence of actions with the final location is limited within this G_s. Therefore, each entity knows if it is walking within or off G_s. If the entity walks off the G_s, the G_s is expanded and updated to cover the new locations and paths.

Figure 12:
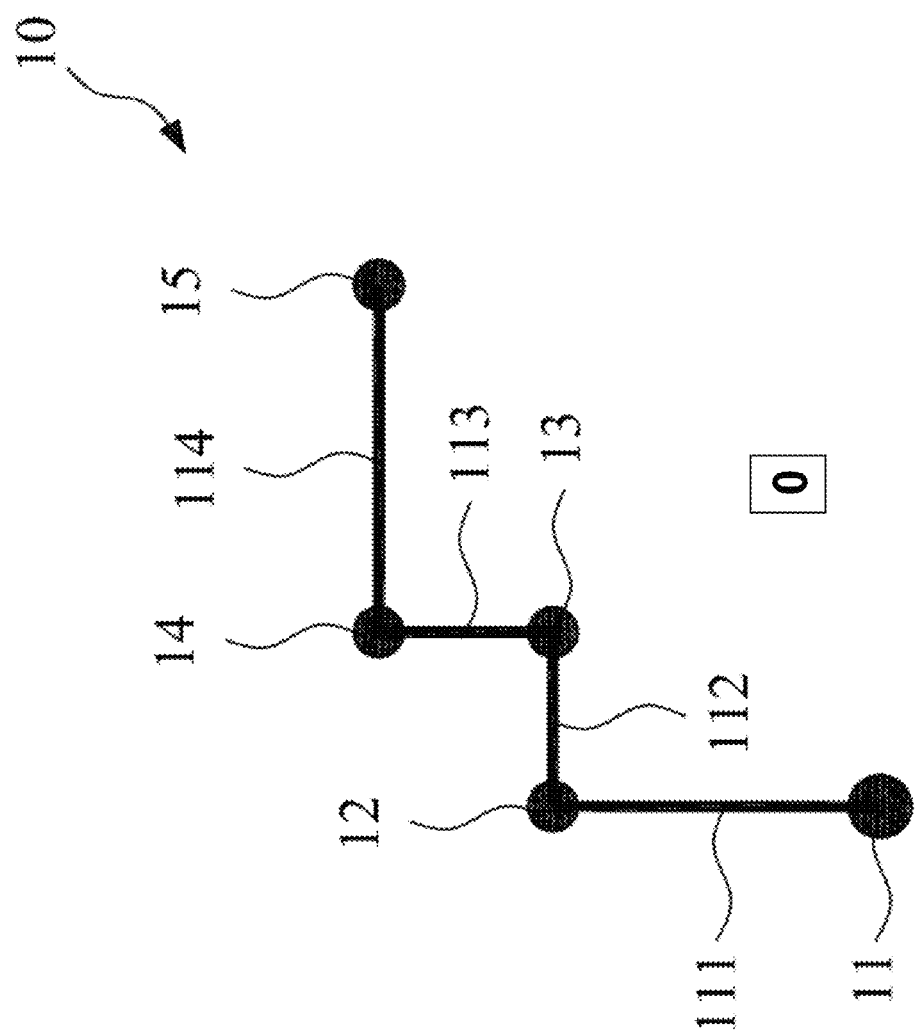
FIG. 12 illustrates a schematic view of a self-map of a first entity in a collaboration method for spatial navigation.
Figure 13:
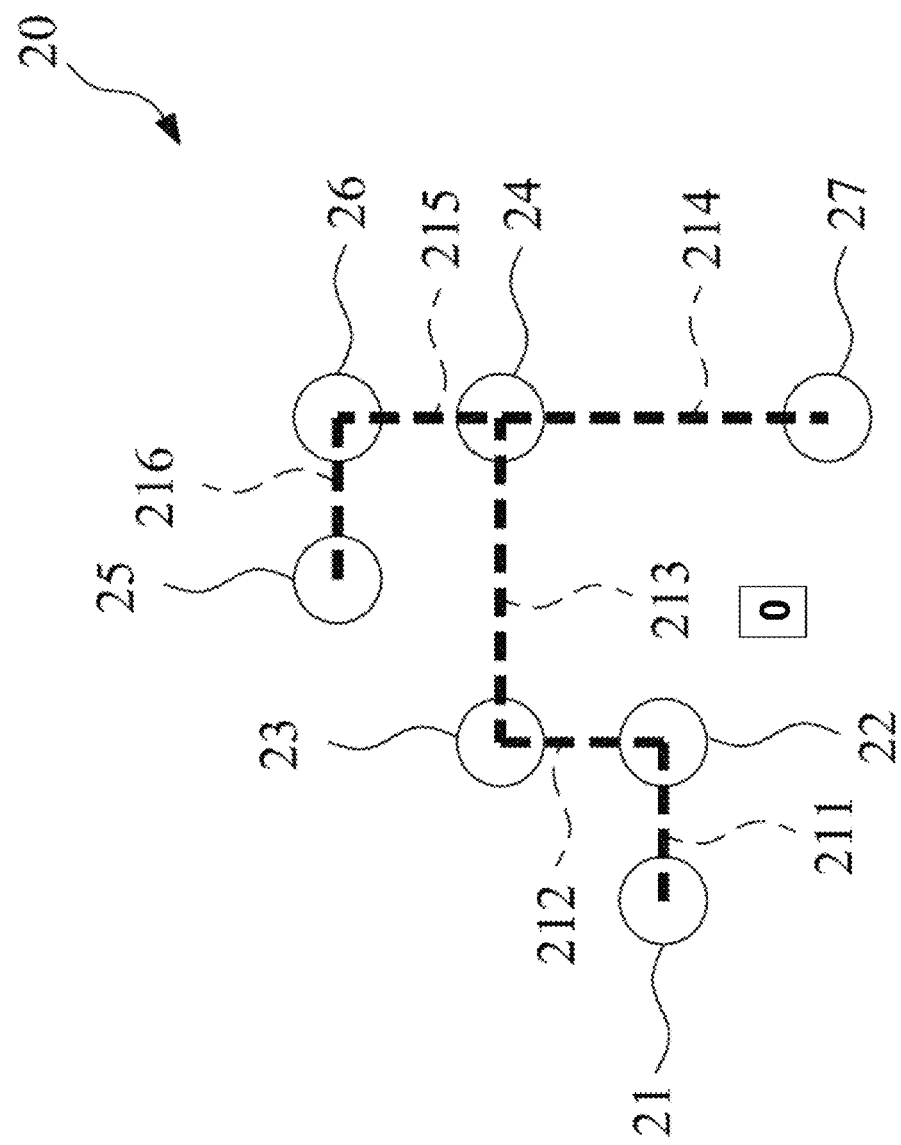
FIG. 13 illustrates a schematic view of a self-map of a second entity in a collaboration method for spatial navigation.

FIG. 12 is a schematic view of a self-map of a first entity according to the collaboration method for spatial navigation. The self-map 10 of the first entity includes a plurality of nodes 11, 12, 13, 14 and 15 and a plurality of edges 111, 112, 113 and 114. The edges connect the nodes. Similarly, FIG. 13 shows a schematic view of a self-map of a second entity according to the present invention. The self-map 20 of the second entity includes a plurality of nodes 21, 22, 23, 24, 25, 26 and 27 and a plurality of edges 211, 212, 213, 214, 215 and 216. The edges connect the nodes. Each edge contains a number representing the distance between the connecting nodes and the orientation.

Therefore, each entity maintains a set of cognitive maps received from the other entities.

Peer_Maps={G_i: G_i=received Self_Map from entity i}

Each entity calculates a confidence index of the received cognitive map G_i and links the cognitive map G_i to the self-map G_s if two topologies and observation vectors matched on these connected nodes. The confidence index would be calculated and assigned to each cognitive map G_i. The confidence index is based on the possible match portion between the cognitive map G_i and the self-map G_s.

Figure 14:
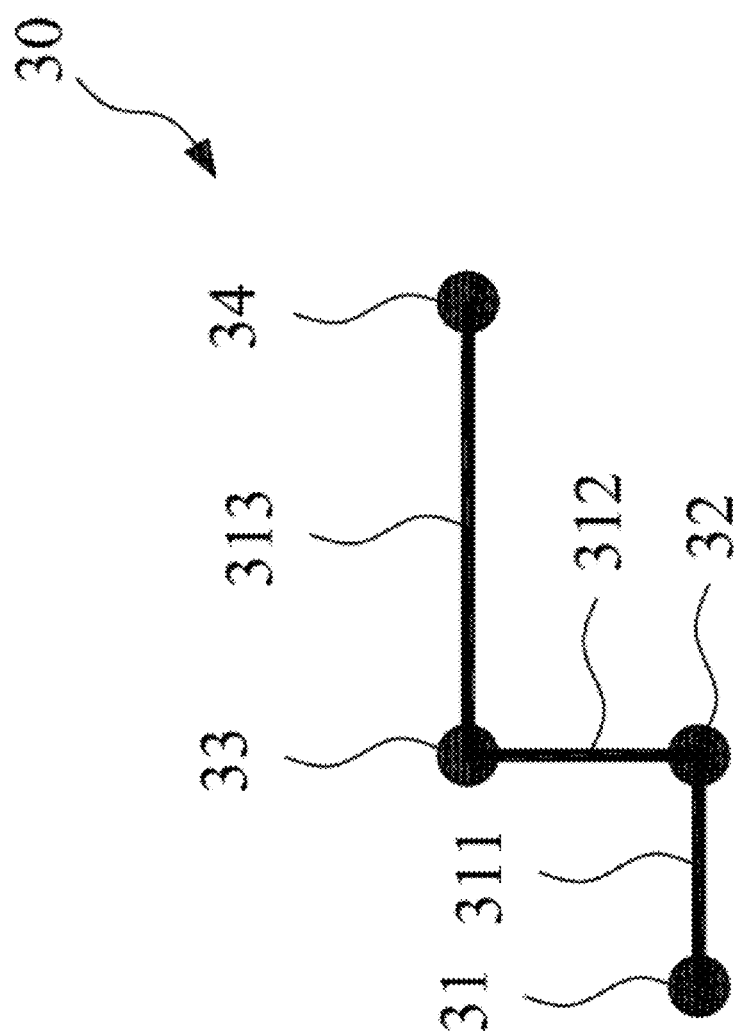
FIG. 14 illustrates a schematic view of a first possible match portion in a collaboration method for spatial navigation.

FIG. 14 illustrates a schematic view of a first possible match portion according to the present invention. In this embodiment, the first possible match portion 30 includes a plurality of nodes 31, 32, 33 and 34 and a plurality of edges 311, 312 and 313. The first possible match portion 30 can be part of the self-map 10 (referring to FIG. 12), for example, the nodes 12, 13, 14 and 15 and the edges 112, 113 and 114. Further, the first possible match portion 30 can be part of the self-map 20 (referring to FIG. 13), for example, the nodes 21, 22, 23 and 24 and the edges 211, 212 and 213. That is, the first possible match portion 30 is a possible overlapped portion between the self-map 10 and the self-map 20 (the cognitive map).

In an exemplary embodiment, the possible match portion 30 can be obtained by the TOD algorithm in the present invention. More specifically, the first self-map 10 may include an origin "0" and a plurality of feature points 11, 12, 13, 14, 15, while the second self-map 20 may include an origin "0" and a plurality of feature points 21, 22, 23, 24, 25, 26 and 27. The angle sequence to determine the Angle TOD (A-TOD) can be obtained from the feature points in both the first self-map 10 and second self-map 20. Similarly, the magnitude sequence to determine the Magnitude TOD (M-TOD) can also be obtained from the feature points in both the first self-map 10 and second self-map 20.

As discussed above, a comparison may be conducted to generate a score to determine which portion of the first self-map 10 and second self-map 20 is the closest, and first possible match portion 30 would be the closest result obtained by using the TOD algorithm in the present invention.

Figure 15:
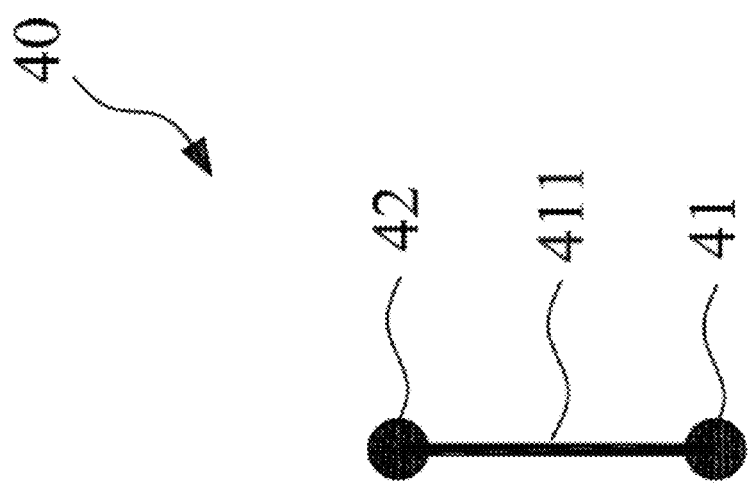
FIG. 15 illustrates a schematic view of a second possible match portion in a collaboration method for spatial navigation.

FIG. 15 shows a schematic view of a second possible match portion according to the present invention. The second possible match portion 40 may include a plurality of nodes 41 and 42 and an edge 411. The second possible match portion 40 can be part of the self-map 10 (referring to FIG. 12), for example, the nodes 11 and 12 and the edge 111. Further, the second possible match portion 40 can be part of the self-map 20 (referring to FIG. 13), for example, the nodes 27 and 24 and the edge 214. Namely, the second possible match portion 40 is a possible overlapped portion between the self-map 10 and the self-map 20 (the cognitive map). Comparing the first possible match portion 30 and the second possible match portion 40, the first possible match portion 30 is the best possible match portion, and can be used to link the self-map 10 and the self-map 20 firstly.

Figure 16:
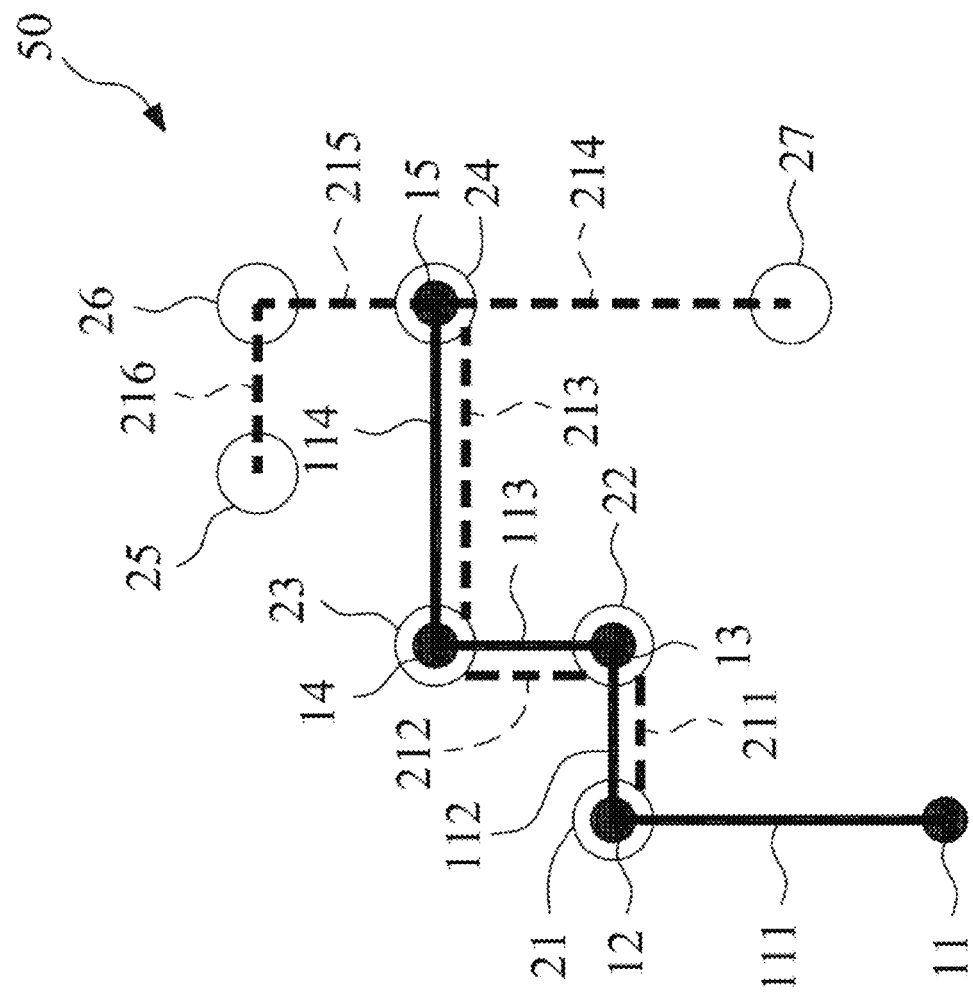
FIG. 16 shows a schematic view of a virtual self-map in a collaboration method for spatial navigation.

FIG. 16 illustrates a schematic view of a virtual self-map. For the first entity, if the confidence index of the cognitive map 20 from the second entity is no less than a threshold value, the self-map 10 and the cognitive map 20 form the second entity are overlapped to be the virtual self-map 50 by combining the first possible match portion 30 (referring to FIG. 14) between the self-map 10 and the cognitive map 20. Therefore, the virtual self-map 50 of the first entity includes the self-map 10 and the cognitive map 20 by overlapping the first possible match portion. That is, the first entity can expand the self-map 10 to the virtual self-map 50 including the nodes and edges visited by the second entity.

By repeating the above step of constructing the virtual self-map 50 of the first entity, the virtual self-map 50 can be further expanded to form a virtual whole map for a specific space. Therefore, for the first entity, the virtual whole map can be constructed in a short time. Similarly, for the other entities, the virtual whole map can be constructed in a short time using the collaboration method of the invention.

In one embodiment, the collaboration method for spatial navigation further includes a step of calculating the confidence index of the cognitive map, wherein the confidence index is increased when the at least one possible match portion increases, or the confidence index is reduced when the at least one possible match portion reduces. Furthermore, the virtual self-map has a confidence score according to the confidence index of each cognitive map from the other entity.

In another embodiment, the collaboration method for spatial navigation further includes a step of verifying whether the virtual self-map is correct by extending the self-map to at least one node. Referring to FIG. 16, if the first entity walks toward the west direction from the node 12, the first entity finds the node 23 of the cognitive map should be on the west side of the node 12. Therefore, the virtual self-map 50 is not correct after the verifying step.

Figure 17:
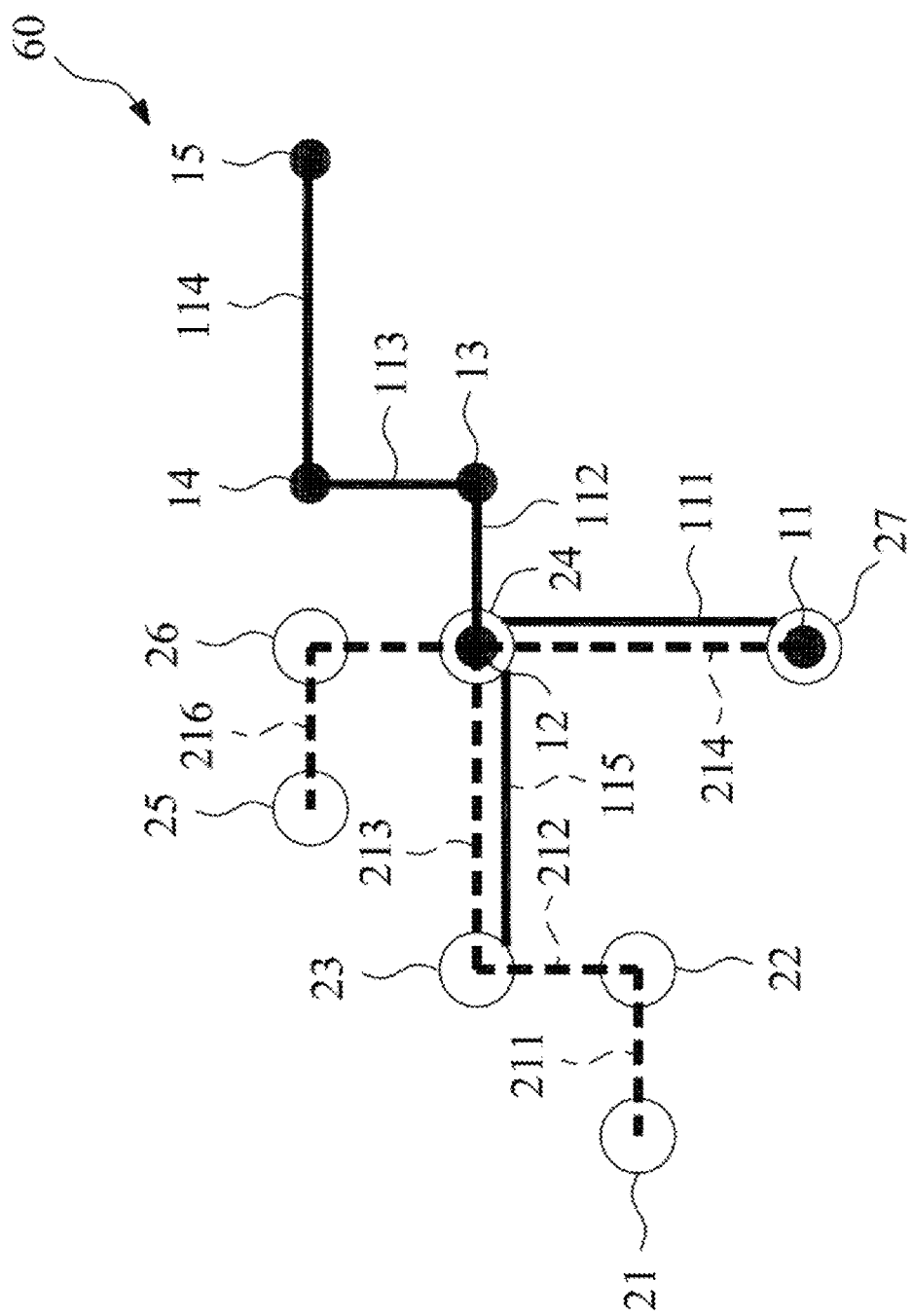
FIG. 17 illustrates a schematic view of a first adjusted virtual self-map in a collaboration method for spatial navigation.

In a further embodiment, the collaboration method for spatial navigation further includes a step of dynamically adjusting the virtual self-map by overlapping the self-map and at least one cognitive map received form at least one other entity by combining at least one second possible match portion between the self-map and at least one cognitive map. Referring to FIG. 17, it shows a schematic view of a first adjusted virtual self-map according to the present invention. In this embodiment, the virtual self-map 50 is not correct after the verifying step. Then, the self-map 10 and the cognitive map 20 form the second entity are overlapped again to form the first adjusted virtual self-map 60 by combining the second possible match portion 40 (referring to FIG. 15) between the self-map 10 and the cognitive map 20. Thus, the first adjusted virtual self-map 60 of the first entity includes the self-map 10 and the cognitive map 20 by overlapping the second possible match portion.

Figure 18:
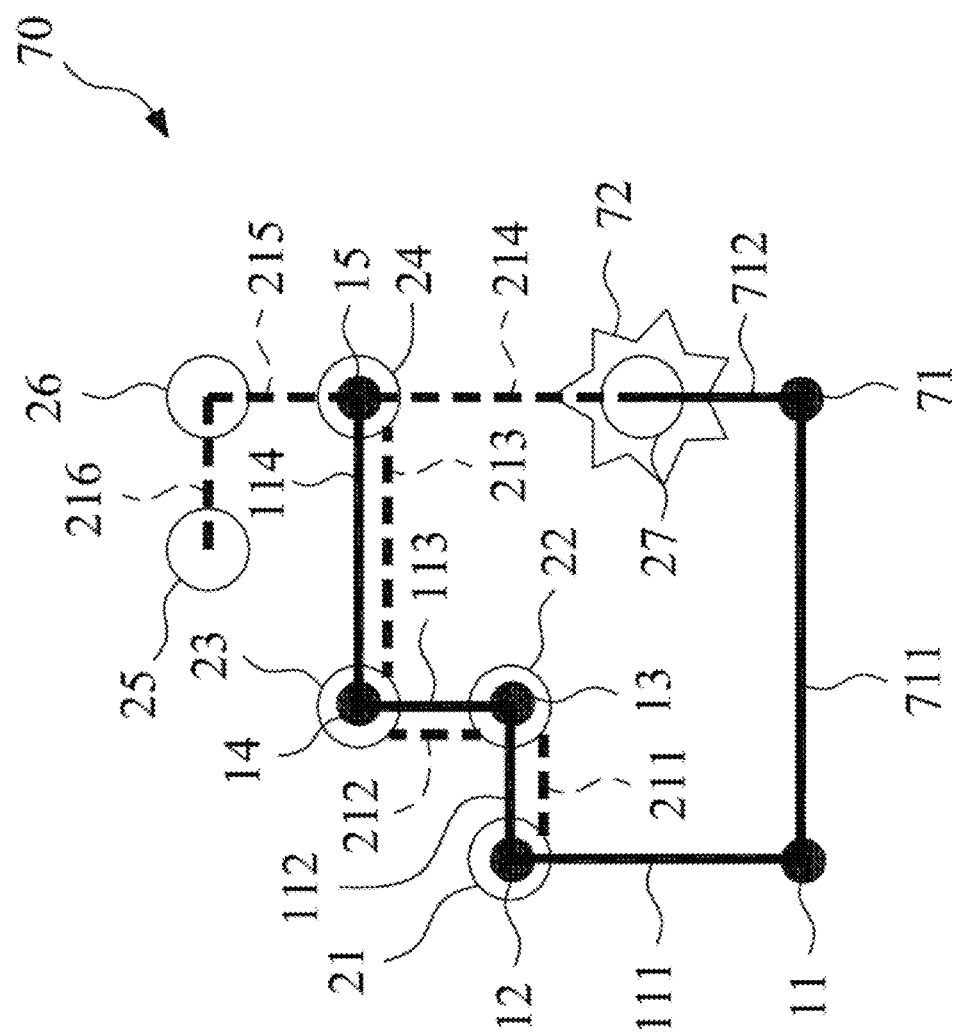
FIG. 18 shows a schematic view of a virtual self-map with a conflict point in a collaboration method for spatial navigation.

Referring to FIG. 18, it shows a schematic view of a virtual self map with a conflict point. The self-map is extended to at least one node of the virtual self-map, and the at least one node is a conflict point if the virtual self-map is not correct. In this embodiment, if the first entity walks toward east direction from the node 11 to reach the node 71 then walks toward north direction to reach the node 72, the node 72 should be the node 27. However, the first entity finds the node 72 is not the node 27. The node 27 is a conflict point, thus the virtual self-map 70 is not correct.

Figure 19:
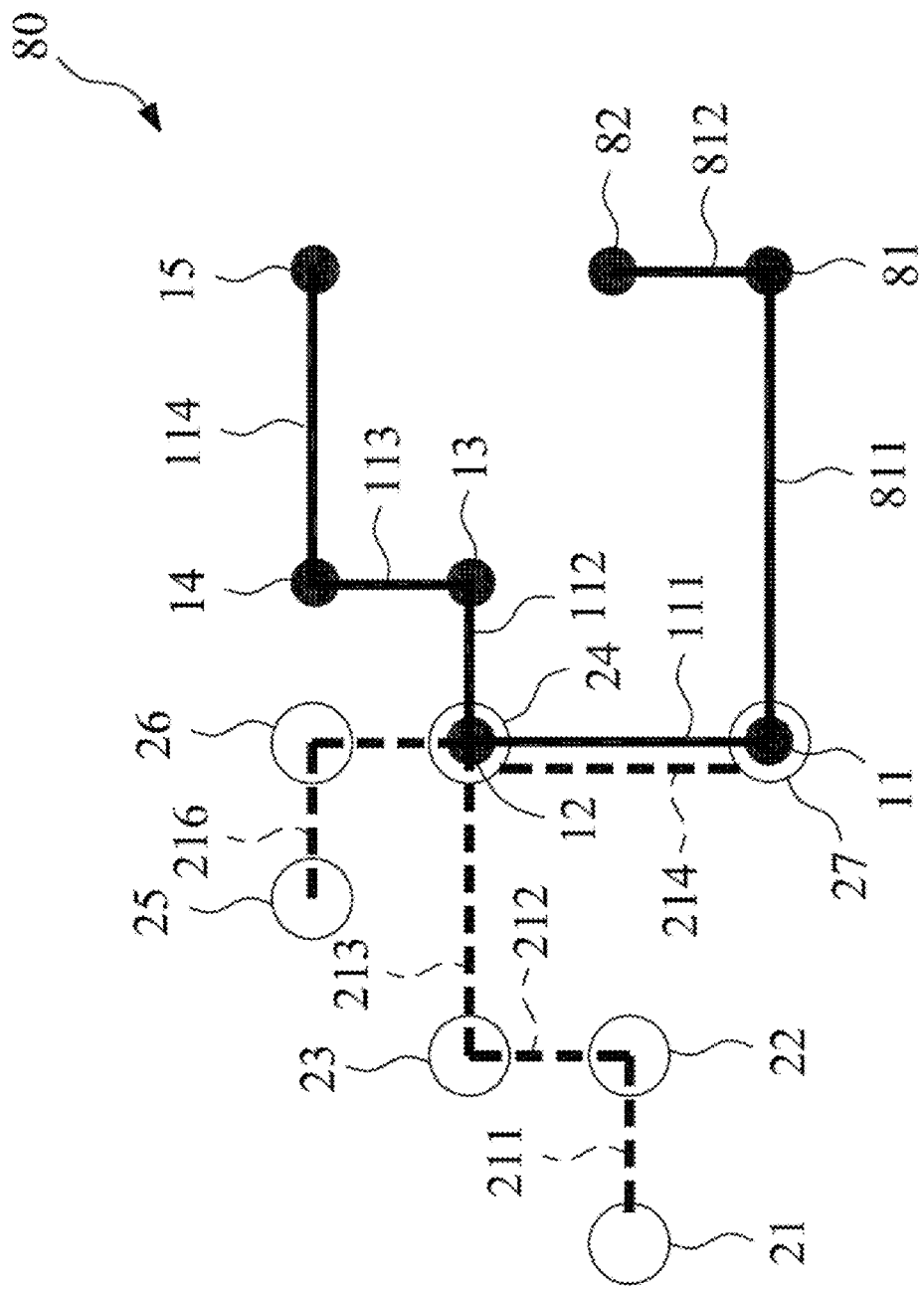
FIG. 19 illustrates a schematic view of a second adjusted virtual self-map in a collaboration method for spatial navigation.

After finding the conflict point of the virtual self-map, the collaboration method for spatial navigation further includes a step of dynamically adjusting the virtual self-map by overlapping the self-map and at least one cognitive map received form at least one other entity by combining at least one second possible match portion between the self-map and at least one cognitive map. FIG. 19 shows a schematic view of a second adjusted virtual self-map according to the present invention. In this embodiment, the virtual self-map 70 is not correct after finding the conflict point. Then, the self-map 10 and the cognitive map 20 form the second entity are overlapped again to form the second adjusted virtual self-map 80 by combining the second possible match portion 40 (referring to FIG. 15) between the self-map 10 and the cognitive map 20. Thus, the second adjusted virtual self-map 80 of the first entity includes the self-map 10 and the cognitive map 20 by overlapping the second possible match portion.

Therefore, after the verifying step and the dynamically adjusting step, the second adjusted virtual self-map 80 can be the optimal virtual self-map. And, after the repeating steps and resolving all the conflict points from the virtual self-map, the optimal virtual whole map can be obtained to improve the precision of the virtual whole map.

Experiment III

Adaptive Electronic Design Automation

Design automation has the ultimate goal of finishing everything automatically given a design concept from human beings. However, existing electronic design automation (EDA) tools still need tremendous tuning and manual fixing since existing EDA tools cannot capture domain-specific knowledge and sheer complexity of nanometer-scale designs. In other words, these very valuable "human" experiences are not captured in existing EDA tools, in an automatic and adaptive manner.

In practice, an identical EDA tool adopted by different design companies usually has the same capabilities even it is used in different design fields since EDA vendors provide tools to cover as many customers and design types as possible. The users could help improve the tools through providing feedbacks to the EDA vendors, or manually tweaking by individual designers (which are not scalable).

On the other hand, some design experiences are the most valuable and proprietary assets for design companies, which they do not want to share. So, the dream EDA tools desired by design companies are those to allow users to sharpen the tools internally and adaptively to incorporate their domain expertise and design experiences.

However, these human experiences and lessons are often hard to be represented by general equations or algorithms, due to the domain/design specific nature, and the missing links are the lack of (i) the mechanism to learn from human design activities; (ii) the capability of asking the "pivot" questions which can be best answered by human experts; and (iii) how to efficiently store, extract and utilize the answers (expert solutions) to these "pivot" questions.

The long runtime of the EDA tools usually is spent only on a few difficult conditions such as competing the resources in routing on a critical region. Solving everything entirely in machines is a misleading concept nowadays. Instead, many of these runtime consuming cases could be easily solved by humans. Therefore, a key question is how to let EDA tools realize the limit of its capability and request "pivot" questions to be solved by human beings. An adaptive EDA framework with experience learning to automatically evolve itself through the accumulation of the experiences.

During the design process, many stages on the flow are best represented as images, such as layouts which are images of mask stacks. Schematics and even other more abstract concepts could be effectively represented as images. In fact, human experiences are mostly defined through images or patterns. As how human vision works, extracting the repeatable local features from the image is the first step. A local feature is a pattern that differs from its immediate neighborhood. Through recognizing the local features, vision senses the similarity and relationship of different objects. Generally speaking, feature extraction needs to be (i) Fast—the speed of the feature extraction cannot be a burden or bottleneck of the overall runtime; (ii) Robust—identical or similar images should have highly matched features; and (iii) Scaling and rotation invariant—scaling and rotation should not change the description of the features.

Figure 20:
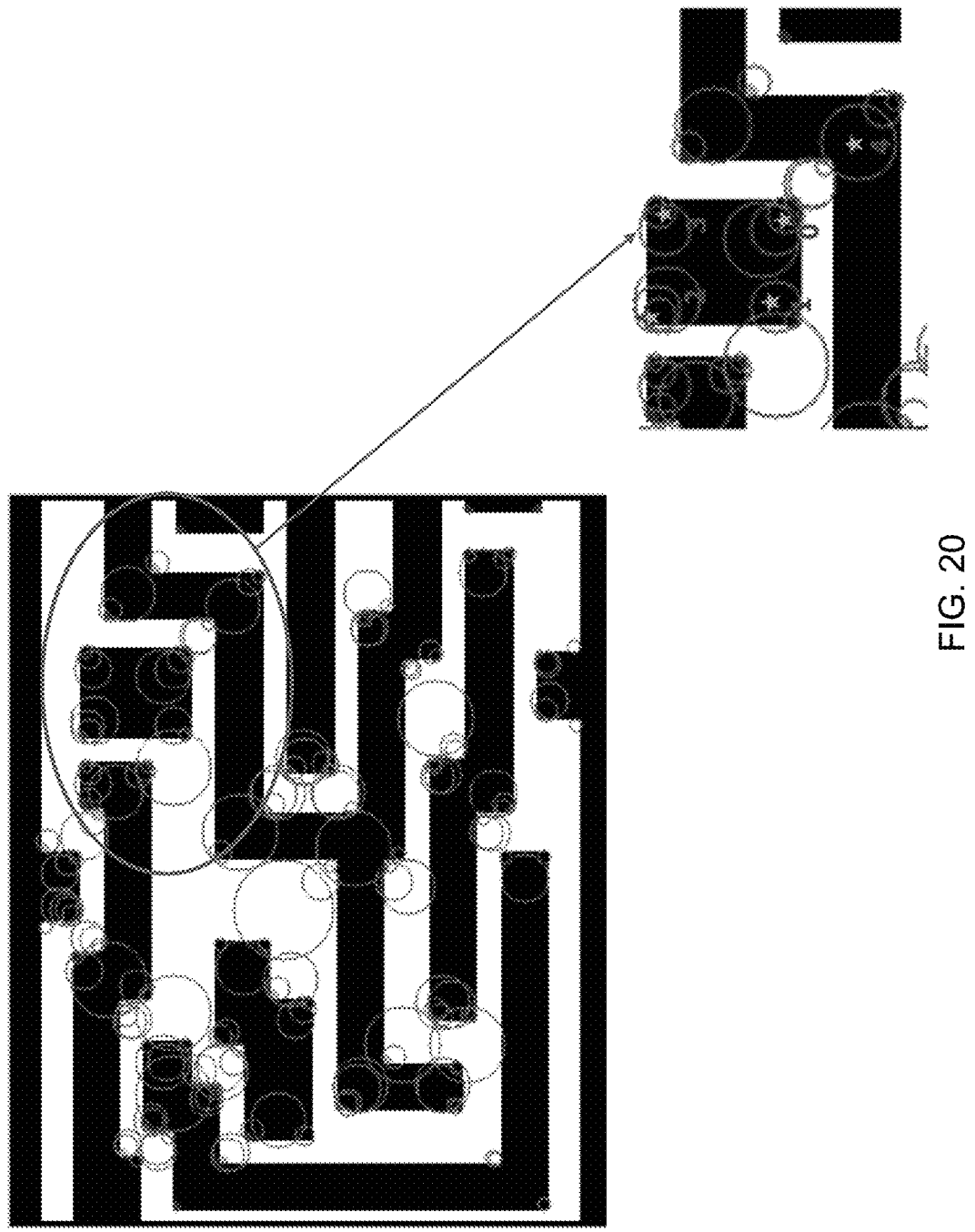
FIG. 20 illustrates a local feature extracted in a layout in an electronic design automation (EDA) incorporating the TOD algorithm in the present invention.

As discussed above, one of the advantages of using the TOD algorithm in the present invention is to provide correct relative positions between two images to effectively distinguish local features. For example, as shown in FIG. 20, a local feature is extract from a given layout, and a plurality of feature points are assigned to the extracted local feature. Similar to the previous two examples, "0" is set as the origin when taking the polar coordinates of the locations of the features. By sorting the magnitude of the local features, the magnitude sequence is obtained as {1324}, while the radian sequence is {3412}. A comparison may be further conducted to compare the query image and the stored images in the database to find out the best match with the local feature in FIG. 20.

According to the experiment results, the TOD algorithm repeatedly demonstrates its robustness to retrieve matching images in the image database even though the condition of the image is poor. Comparing with the conventional image retrieval techniques, the TOD algorithm is advantageous because it is more efficient, scale and rotation invariant, and tolerant to affine and perspective transformation.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A computer-implemented method for providing a fast index of imaged design data in an electronic design automation (EDA) application, comprising:
   receiving one or more input images with at least two dimensions;
   extracting two or more key features on the input images;
   determining an origin and two or more feature points on the key features on the input images;
   selecting a coordinate system to determine a position of each feature point in the input images, wherein the position of each feature point is determined by at least two parameters according to the dimensions of the input images;
   establishing a topological relationship in each dimension between the feature points on the key features; and
   utilizing the topological relationship in each dimension between the feature points to identify the input images in an image database,
   wherein the step of establishing a topological relationship in each dimension between the feature points on the key features comprises steps of calculating and sorting topological distances between each feature points and the origin to produce one or more sequences according to the dimension of the image, and the sequence at least includes a first sequence related to a first parameter between the origin and each feature points, and a second sequence related to a second parameter between the origin and each feature points in the input image, and wherein the sequence includes an angle sequence and a magnitude sequence in the two-dimensional image.

2. The computer-implemented method for providing a fast index of the imaged design data in an electronic design automation (EDA) application of claim 1, wherein the step of determining an origin and one or more feature points on the key features on the input images comprises steps of selecting an origin on the input images; and selecting one or more feature points representing a portion of key features near the origin.

3. The computer-implemented method for providing a fast index of the imaged design data in an electronic design automation (EDA) application of claim 1, wherein the coordinate system is a polar coordinate system for a two-dimensional image, and the first parameter is angle and the second parameter is distance.

4. The computer-implemented method for providing a fast index of the imaged design data in an electronic design automation (EDA) application of claim 1, wherein the step of utilizing the topological relationship between the feature points to identify the input image in an image database includes steps of building a predetermined data structure in the image database; providing the key features from the input image; retrieving the key features (from the input image) in the predetermined data structure within a given range; comparing the sequence(s) between the input images and possible matching images in the image database to generate one or more topological order distance (TOD) scores; and calculating and sorting the TOD scores to retrieve matching images in the image database.

5. The computer-implemented method for providing a fast index of the imaged design data in an electronic design automation (EDA) application of claim 1, wherein the step of utilizing the topological relationship between the feature points to identify the input image in an image database includes steps of building a predetermined data structure in the image database; providing the key features from the input image; retrieving the key features (from the input image) in the predetermined data structure within a given range; comparing the magnitude sequences and angle sequences between the input images and possible matching images in the image database to generate a magnitude topological order distance (M-TOD) score and an angle topological order distance (A-TOD) score; and calculating and sorting the M-TOD and A-TOD scores to retrieve matching images in the image database.

\* \* \* \* \*